US009989764B2

(12) United States Patent
Alexander et al.

(10) Patent No.: US 9,989,764 B2
(45) Date of Patent: Jun. 5, 2018

(54) SYSTEMS, DEVICES, AND METHODS FOR EYEBOX EXPANSION IN WEARABLE HEADS-UP DISPLAYS

(71) Applicant: THALMIC LABS INC., Kitchener (CA)

(72) Inventors: Stefan Alexander, Elmira (CA); Matthew Bailey, Kitchener (CA); Vance R. Morrison, Kitchener (CA); Lloyd Frederick Holland, Kitchener (CA); Joshua Moore, Elora (CA)

(73) Assignee: THALMIC LABS INC., Kitchener (CA)

( * ) Notice: Subject to any disclaimer, the term of this patent is extended or adjusted under 35 U.S.C. 154(b) by 144 days.

(21) Appl. No.: 15/046,254

(22) Filed: Feb. 17, 2016

(65) Prior Publication Data
US 2016/0377866 A1 Dec. 29, 2016

Related U.S. Application Data

(60) Provisional application No. 62/117,316, filed on Feb. 17, 2015, provisional application No. 62/156,736, (Continued)

(51) Int. Cl.
G08G 5/00 (2006.01)
G02B 27/01 (2006.01)
(Continued)

(52) U.S. Cl.
CPC ......... G02B 27/0172 (2013.01); G02B 26/10 (2013.01); G02B 27/0081 (2013.01);
(Continued)

(58) Field of Classification Search
None
See application file for complete search history.

(56) References Cited

U.S. PATENT DOCUMENTS 3,408,133 A 10/1968 Lee
5,103,323 A 4/1992 Magarinos et al.
(Continued)

FOREIGN PATENT DOCUMENTS

JP 61-198892 A 9/1986
JP 2013-160905 A 8/2013
WO 2015/123775 A1 8/2015

OTHER PUBLICATIONS

International Search Report and Written Opinion dated Apr. 25, 2017 for corresponding International Application No. PCT/US2016/067246, 12 pages.
(Continued)

Primary Examiner — Ifedayo Iluyomade
(74) Attorney, Agent, or Firm — Seed IP Law Group LLP

(57) ABSTRACT

Systems, devices, and methods for eyebox expansion by exit pupil replication in wearable heads-up displays ("WHUDs") are described. A WHUD includes a scanning laser projector ("SLP"), a holographic combiner, and an optical splitter positioned in the optical path therebetween. The optical splitter receives light signals generated by the SLP and separates the light signals into N sub-ranges based on the point of incidence of each light signal at the optical splitter. The optical splitter redirects the light signals corresponding to respective ones of the N sub-ranges towards the holographic combiner effectively from respective ones of N spatially-separated virtual positions for the SLP. The holographic combiner converges the light signals to respective ones of N spatially-separated exit pupils at the eye of the user. In this way, multiple instances of the exit pupil are distributed over the area of the eye and the eyebox of the WHUD is expanded.

26 Claims, 11 Drawing Sheets

Related U.S. Application Data filed on May 4, 2015, provisional application No. 62/242,844, filed on Oct. 16, 2015.

(51) Int. Cl.

| | |
|---|---|
| *G06F 3/01* | (2006.01) |
| *G02B 26/10* | (2006.01) |
| *G02B 27/00* | (2006.01) |
| *G03H 1/26* | (2006.01) |
| *G09G 3/00* | (2006.01) |

(52) U.S. Cl.
CPC .......... *G02B 27/017* (2013.01); *G03H 1/265* (2013.01); *G03H 1/2645* (2013.01); *G06F 3/013* (2013.01); *G09G 3/001* (2013.01); *G02B 2027/0112* (2013.01); *G02B 2027/0123* (2013.01); *G02B 2027/0125* (2013.01); *G02B 2027/0174* (2013.01); *G02B 2027/0178* (2013.01); *G03H 2001/266* (2013.01)

(56) References Cited

U.S. PATENT DOCUMENTS

| | | |
|---|---|---|
| 5,467,104 A | 11/1995 | Furness, III et al. |
| 5,596,339 A | 1/1997 | Furness, III et al. |
| 5,742,421 A | 4/1998 | Wells et al. |
| 6,008,781 A | 12/1999 | Furness, III et al. |
| 6,184,847 B1 | 2/2001 | Fateh et al. |
| 6,236,476 B1 | 5/2001 | Son et al. |
| 6,317,103 B1 | 11/2001 | Furness, III et al. |
| 6,377,277 B1 | 4/2002 | Yamamoto |
| 6,639,570 B2 | 10/2003 | Furness, III et al. |
| 6,972,734 B1 | 12/2005 | Ohshima et al. |
| 7,473,888 B2 | 1/2009 | Wine et al. |
| 7,640,007 B2 | 12/2009 | Chen et al. |
| 7,684,105 B2 | 3/2010 | Lamontagne et al. |
| 7,850,306 B2 | 12/2010 | Uusitalo et al. |
| 7,925,100 B2 | 4/2011 | Howell et al. |
| 8,120,828 B2 | 2/2012 | Schwerdtner |
| 8,179,604 B1 | 5/2012 | Prada Gomez et al. |
| 8,188,937 B1 | 5/2012 | Amafuji et al. |
| 8,355,671 B2 | 1/2013 | Kramer et al. |
| 8,666,212 B1 | 3/2014 | Amirparviz |
| 8,704,882 B2 | 4/2014 | Turner |
| 8,922,481 B1 | 12/2014 | Kauffmann et al. |
| 8,970,571 B1 | 3/2015 | Wong et al. |
| 8,971,023 B2 | 3/2015 | Olsson et al. |
| 9,086,687 B2 | 7/2015 | Park et al. |
| 2001/0033402 A1 | 10/2001 | Popovich |
| 2002/0003627 A1 | 1/2002 | Rieder |
| 2002/0030636 A1 | 3/2002 | Richards |
| 2002/0120916 A1 | 8/2002 | Snider, Jr. |
| 2005/0012715 A1 | 1/2005 | Ford |
| 2007/0132785 A1 | 6/2007 | Ebersole, Jr. et al. |
| 2009/0207464 A1 | 8/2009 | Wiltshire et al. |
| 2010/0149073 A1 | 6/2010 | Chaum et al. |
| 2012/0002256 A1 | 1/2012 | Lacoste et al. |
| 2012/0139817 A1 | 6/2012 | Freeman |
| 2012/0188158 A1 | 7/2012 | Tan et al. |
| 2012/0249797 A1 | 10/2012 | Haddick et al. |
| 2013/0016292 A1 | 1/2013 | Miao et al. |
| 2013/0016413 A1 | 1/2013 | Saeedi et al. |
| 2013/0135722 A1 | 5/2013 | Yokoyama |
| 2013/0165813 A1 | 6/2013 | Chang et al. |
| 2013/0198694 A1 | 8/2013 | Rahman et al. |
| 2013/0215235 A1 | 8/2013 | Russell |
| 2013/0222384 A1 | 8/2013 | Futterer |
| 2013/0265437 A1 | 10/2013 | Thöm et al. |
| 2013/0332196 A1 | 12/2013 | Pinsker |
| 2013/0335302 A1 | 12/2013 | Crane et al. |
| 2014/0045547 A1 | 2/2014 | Singamsetty et al. |
| 2014/0198034 A1 | 7/2014 | Bailey et al. |
| 2014/0198035 A1 | 7/2014 | Bailey et al. |
| 2014/0202643 A1 | 7/2014 | Hikmet et al. |
| 2014/0204455 A1 | 7/2014 | Popovich et al. |
| 2014/0226193 A1 | 8/2014 | Sun |
| 2014/0232651 A1 | 8/2014 | Kress et al. |
| 2014/0285429 A1 | 9/2014 | Simmons |
| 2014/0368896 A1 | 12/2014 | Nakazono et al. |
| 2015/0036221 A1 | 2/2015 | Stephenson |
| 2015/0205134 A1 | 7/2015 | Bailey et al. |
| 2015/0325202 A1 | 11/2015 | Lake et al. |
| 2015/0362734 A1 | 12/2015 | Moser et al. |
| 2015/0378161 A1 | 12/2015 | Bailey et al. |
| 2015/0378162 A1 | 12/2015 | Bailey et al. |
| 2015/0378164 A1 | 12/2015 | Bailey et al. |
| 2016/0033771 A1* | 2/2016 | Tremblay .......... G02B 27/0172 345/8 |
| 2016/0202081 A1 | 7/2016 | Debieuvre et al. |
| 2016/0238845 A1 | 8/2016 | Alexander et al. |
| 2016/0274365 A1 | 9/2016 | Bailey et al. |
| 2016/0274758 A1 | 9/2016 | Bailey |
| 2016/0313899 A1 | 10/2016 | Noel |
| 2016/0327796 A1 | 11/2016 | Bailey et al. |
| 2016/0349514 A1 | 12/2016 | Alexander et al. |
| 2016/0349515 A1 | 12/2016 | Alexander et al. |
| 2016/0349516 A1 | 12/2016 | Alexander et al. |
| 2016/0377865 A1 | 12/2016 | Alexander et al. |
| 2017/0068095 A1 | 3/2017 | Holland et al. |
| 2017/0097753 A1 | 4/2017 | Bailey et al. |
| 2017/0115483 A1 | 4/2017 | Aleem et al. |

OTHER PUBLICATIONS

Amitai, "P-27: A Two-Dimensional Aperture Expander for Ultra-Compact, High-Performance Head-Worn Displays," *SID Symposium Digest of Technical Papers* 36(1):360-363, 2005.
Äyräs et al., "Exit pupil expander with a large field of view based on diffractive optics," *Journal of the SID* 17(8):659-664, 2009.
Chellappan et al., "Laser-based displays: a review," *Applied Optics* 49(25):F79-F98, 2010.
Cui et al., "Diffraction from angular multiplexing slanted volume hologram gratings," *Optik* 116:118-122, 2005.
Curatu et al., "Dual Purpose Lens for an Eye-Tracked Projection Head-Mounted Display," International Optical Design Conference 2006, *SPIE-OSA* 6342:63420X-1-63420X-7, 2007.
Curatu et al., "Projection-based head-mounted display with eye-tracking capabilities," *Proc. of SPIE* 5875:58750J-1-58750J-9, 2005.
Essex, "Tutorial on Optomechanical Beam Steering Mechanisms," OPTI 521 Tutorial, College of Optical Sciences, University of Arizona, 8 pages, 2006.
Fernández et al., "Optimization of a thick polyvinyl alcohol-acrylamide photopolymer for data storage using a combination of angular and peristrophic holographic multiplexing," *Applied Optics* 45(29):7661-7666, 2009.
Hainich et al., "Chapter 10: Near-Eye Displays," *Displays: Fundamentals & Applications,* AK Peters/CRC Press, 2011, 65 pages.
Hornstein et al., "Maradin's Micro-Mirror—System Level Synchronization Notes," SID 2012 Digest, pp. 981-984.
International Search Report, dated Jun. 8, 2016, for PCT/US2016/018293, 17 pages.
International Search Report, dated Jun. 8, 2016, for PCT/US2016/018298, 14 pages.
International Search Report, dated Jun. 8, 2016, for PCT/US2016/018299, 12 pages.
Itoh et al., "Interaction-Free Calibration for Optical See-Through Head-Mounted Displays based on 3D Eye Localization," 2014 IEEE Symposium on 3D User Interfaces (3DUI), pp. 75-82, 2014.
Kessler, "Optics of Near to Eye Displays (NEDs)," Presentation—Oasis 2013, Tel Aviv, Feb. 19, 2013, 37 pages.
Kress et al., "A review of head-mounted displays (HMD) technologies and applications for consumer electronics," *Proc. of SPIE* 8720:87200A-1-87200A-13, 2013.
Kress et al., " Diffractive and Holographic Optics as Optical Combiners in Head Mounted Displays," Proceedings of the 2013 ACM Conference on Pervasive and Ubiquitous Computing Adjunct Publication, pp. 1479-1482, 2013.

(56) References Cited

OTHER PUBLICATIONS

Kress, "Optical architectures for see-through wearable displays," Presentation—Bay Area—SID Seminar, Apr. 30, 2014, 156 pages.
Levola, "7.1: Invited Paper: Novel Diffractive Optical Components for Near to Eye Displays," *SID Symposium Digest of Technical Papers* 37(1):64-67, 2006.
Liao et al., "The Evolution of MEMS Displays," *IEEE Transactions on Industrial Electronics* 56(4):1057-1065, 2009.
Lippert, "Chapter 6: Display Devices: RSD™ (Retinal Scanning Display)," *The Avionics Handbook,* CRC Press, 2001, 8 pages.
Majaranta et al., "Chapter 3—Eye-Tracking and Eye-Based Human-Computer Interaction," in *Advances in Physiological Computing,* Springer-Verlag London, 2014, pp. 17-39.
Schowengerdt et al., "Stereoscopic retinal scanning laser display with integrated focus cues for ocular accommodation" *Proc. of SPIE-IS&T Electronic Imaging* 5291:366-376, 2004.
Silverman et al., "58.5L: Late News Paper: Engineering a Retinal Scanning Laser Display with Integrated Accommodative Depth Cues," SID 03 Digest, pp. 1538-1541, 2003.
Takatsuka et al., "Retinal projection display using diffractive optical element," Tenth International Conference on Intelligent Information Hiding and Multimedia Signal Processing, IEEE, 2014, pp. 403-406.
Urey et al., " Optical performance requirements for MEMS-scanner based microdisplays," Conf. on MOEMS and Miniaturized Systems, *SPIE* 4178:176-185, 2000.
Urey, "Diffractive exit-pupil expander for display applications," *Applied Optics* 40(32):5840-5851, 2001.
Viirre et al., "The Virtual Retinal Display: A New Technology for Virtual Reality and Augmented Vision in Medicine," *Proc. of Medicine Meets Virtual Reality,* IOS Press and Ohmsha, 1998, pp. 252-257. (6 pages).

* cited by examiner

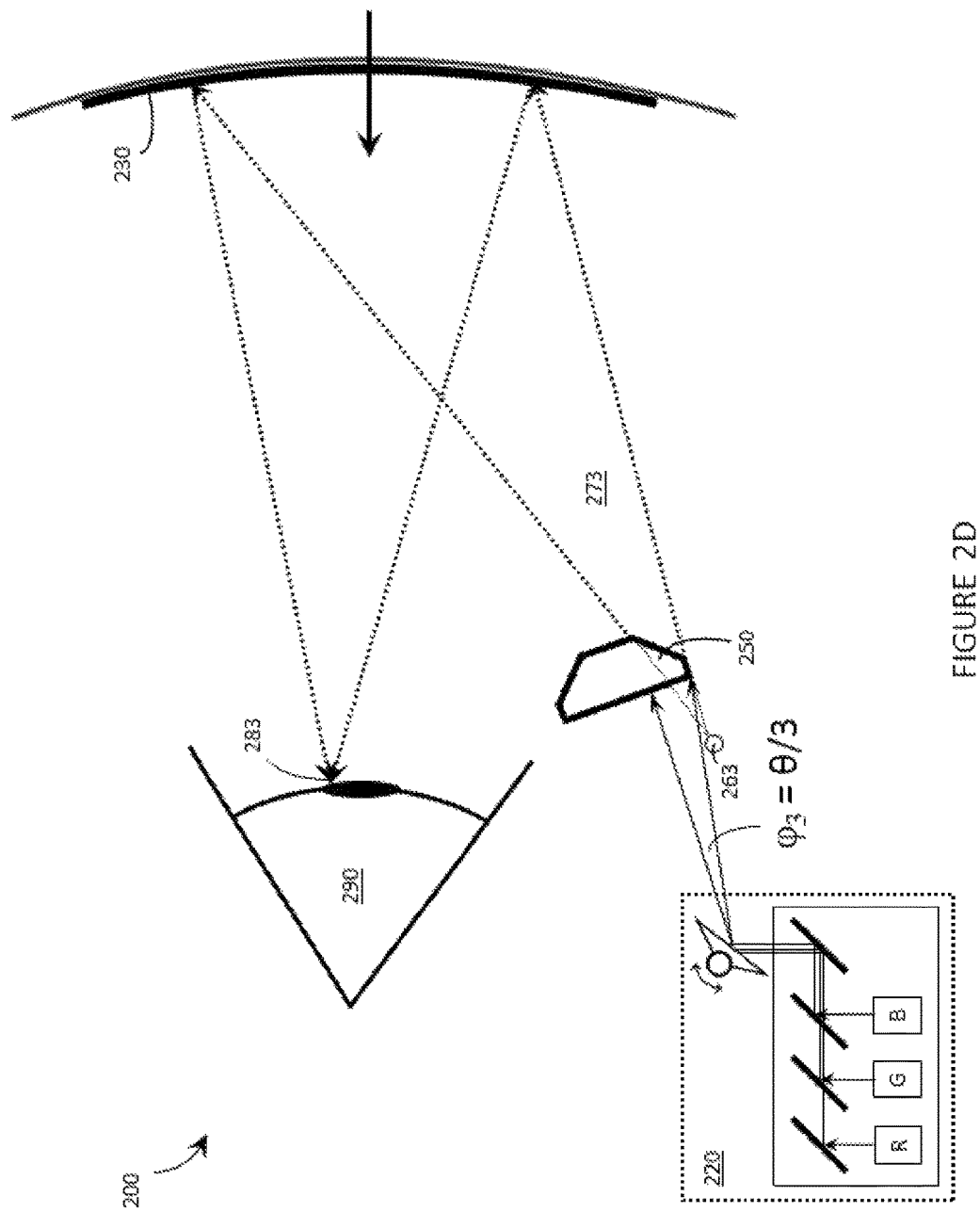

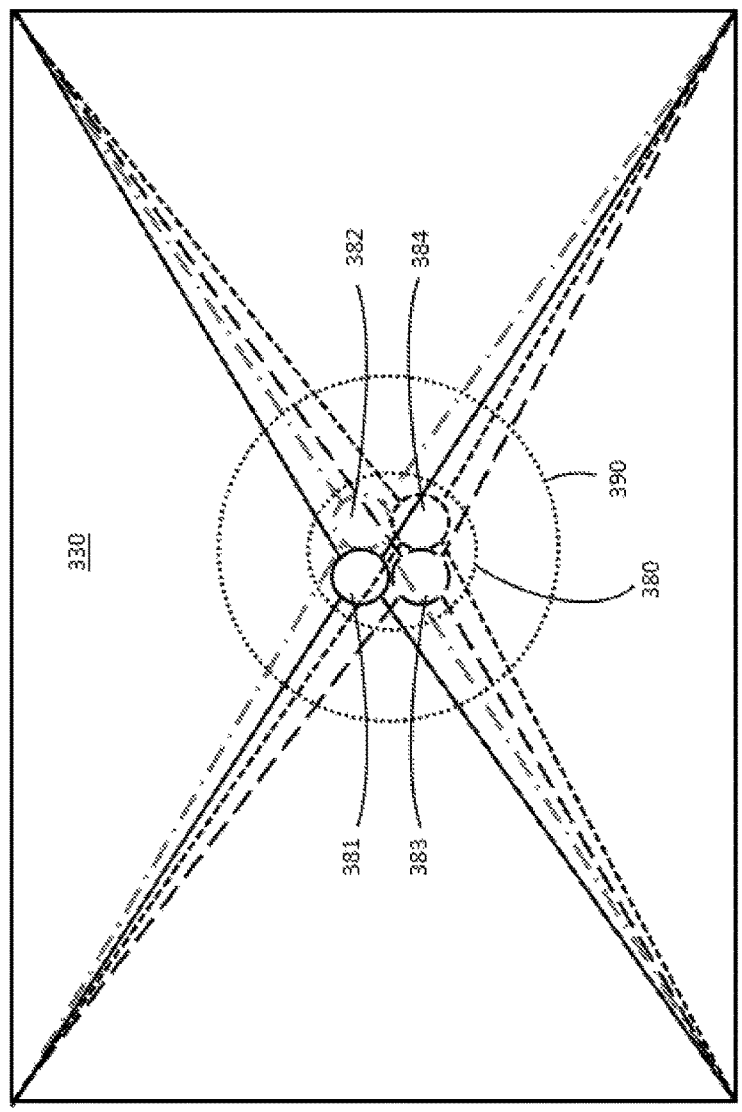

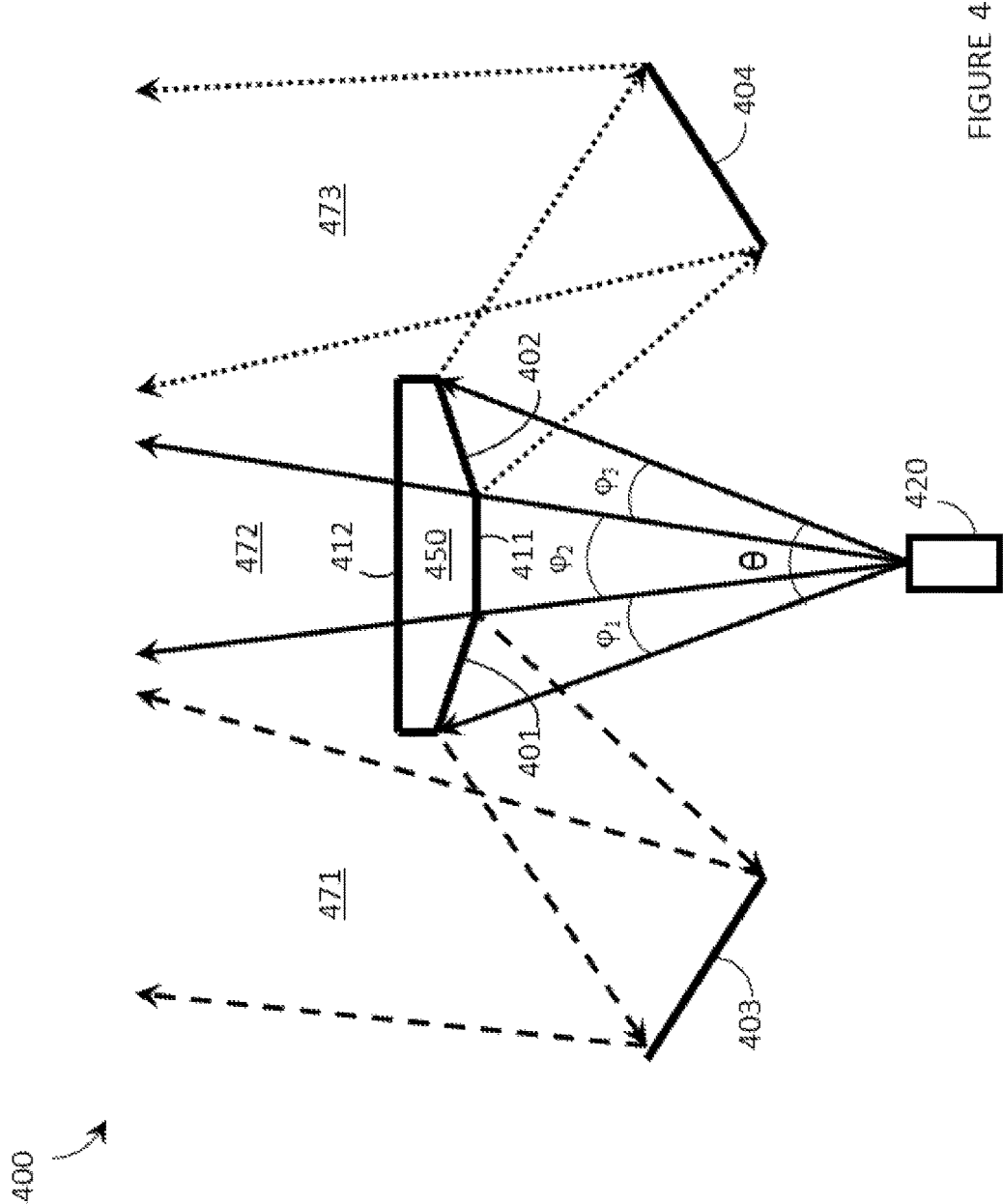

SYSTEMS, DEVICES, AND METHODS FOR EYEBOX EXPANSION IN WEARABLE HEADS-UP DISPLAYS

BACKGROUND

Technical Field

The present systems, devices, and methods generally relate to scanning laser-based display technologies and particularly relate to expanding the eyebox of a scanning laser-based wearable heads-up display.

Description of the Related Art

Wearable Heads-UP Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to minimize the bulk of the face-worn apparatus while still providing displayed content with sufficient visual quality. There is a need in the art for wearable heads-up displays of more aesthetically-appealing design that are capable of providing high-quality images to the user without limiting the user's ability to see their external environment.

Eyebox

In near-eye optical devices such as rifle scopes and wearable heads-up displays, the range of eye positions (relative to the device itself) over which specific content/imagery provided by the device is visible to the user is generally referred to as the "eyebox." An application in which content/imagery is only visible from a single or small range of eye positions has a "small eyebox" and an application in which content/imagery is visible from a wider range of eye positions has a "large eyebox." The eyebox may be thought of as a volume in space positioned near the optical device. When the eye of the user (and more particularly, the pupil of the eye of the user) is positioned inside this volume and facing the device, the user is able to see all of the content/imagery provided by the device. When the eye of the user is positioned outside of this volume, the user is not able to see at least some of the content/imagery provided by the device.

The geometry (i.e., size and shape) of the eyebox is an important property that can greatly affect the user experience for a wearable heads-up display. For example, if the wearable heads-up display has a small eyebox that centers on the user's pupil when the user is gazing directly ahead, some or all content displayed by the wearable heads-up display may disappear for the user when the user gazes even slightly off-center, such as slightly to the left, slightly to the right, slightly up, or slightly down. Furthermore, if a wearable heads-up display that has a small eyebox is designed to align that eyebox on the pupil for some users, the eyebox will inevitably be misaligned relative to the pupil of other users because not all users have the same facial structure. Unless a wearable heads-up display is deliberately designed to provide a glanceable display (i.e., a display that is not always visible but rather is only visible when the user gazes in a certain direction), it is generally advantageous for a wearable heads-up display to have a large eyebox.

Demonstrated techniques for providing a wearable heads-up display with a large eyebox generally necessitate adding more bulky optical components to the display. Technologies that enable a wearable heads-up display of minimal bulk (relative to conventional eyeglass frames) to provide a large eyebox are generally lacking in the art.

BRIEF SUMMARY

A wearable heads-up display may be summarized as including: a support structure that in use is worn on a head of a user; a scanning laser projector carried by the support structure; a holographic combiner carried by the support structure, wherein the holographic combiner is positioned within a field of view of an eye of the user when the support structure is worn on the head of the user; and an optical splitter carried by the support structure and positioned in an optical path between the scanning laser projector and the holographic combiner, the optical splitter comprising at least one optical element arranged to receive light signals generated by the scanning laser projector and redirect each light signal towards the holographic combiner effectively from one of N spatially-separated virtual positions for the scanning laser projector, where N is an integer greater than 1, the particular virtual position for the scanning laser projector from which a light signal is redirected by the optical splitter determined by a point of incidence at which the light signal is received by the optical splitter, and wherein the holographic combiner comprises at least one hologram positioned and oriented to redirect the light signals towards the eye of the user.

The scanning laser projector may have a total two-dimensional scan range $\theta$ and at least one optical element of the optical splitter may be arranged to separate the total two-dimensional scan range $\theta$ of the scanning laser projector into N two-dimensional sub-ranges $\varphi_i$, where $$\sum_{i=1}^{N} \varphi_i = \theta,$$

wherein each one of the N sub-ranges $\varphi_i$ corresponds to a respective one of the N spatially-separated virtual positions for the scanning laser projector. At least one optical element of the optical splitter may be arranged to: receive light signals corresponding to a sweep of the total two-dimensional scan range $\theta$ by the scanning laser projector; separate the light signals corresponding to the sweep of the total two-dimensional scan range θ into the N two-dimensional sub-ranges $\varphi_i$ based on point of incidence at the optical splitter; and redirect the light signals corresponding to the sweep of the total two-dimensional scan range θ towards the holographic combiner effectively from each of the N spatially-separated virtual positions for the scanning laser projector, the particular virtual position for the scanning laser projector from which each light signal in the sweep of the total two-dimensional scan range θ is redirected by the optical splitter determined by the particular two-dimensional sub-range $\varphi_i$ to which the light signal corresponds.

The scanning laser projector may have a total scan range Ω in a first dimension, where 0°<Ω<180°, and at least one optical element of the optical splitter may be arranged to separate the total scan range Ω of the scanning laser projector in the first dimension into X sub-ranges $\omega_i$ in the first dimension, where 1<X≤N and $$\sum_{i=1}^{X} \omega_i = \Omega,$$

and each one of the X sub-ranges $\omega_i$ may correspond to a different one of the N spatially-separated virtual positions for the scanning laser projector. At least one optical element of the optical splitter may be arranged to: receive light signals corresponding to a sweep of the total scan range Ω in the first dimension by the scanning laser projector; separate the light signals corresponding to the sweep of the total scan range Ω in the first dimension into the X sub-ranges $\omega_i$ in the first dimension based on point of incidence at the optical splitter; and redirect the light signals corresponding to the sweep of the total scan range Ω in the first dimension towards the holographic combiner effectively from at least X of the N spatially-separated virtual positions for the scanning laser projector, the particular virtual position for the scanning laser projector from which each light signal in the sweep of the total scan range Ω in the first dimension is redirected by the optical splitter determined by the particular sub-range $\omega_i$ in the first dimension to which the light signal corresponds. The scanning laser projector may have a total scan range ψ in a second dimension, where 0°<ψ<180°, and at least one optical element of the optical splitter may be arranged to separate the total scan range ψ of the scanning laser projector in the second dimension into Y sub-ranges $\beta_i$ in the second dimension, where 1<Y≤N and $$\sum_{i=1}^{Y} \beta_i = \psi,$$

and each one of the Y sub-ranges $\beta_i$ may correspond to a different one of the N spatially-separated virtual positions for the scanning laser projector. At least one optical element of the optical splitter is arranged to: receive light signals corresponding to a sweep of the total scan range ψ in the second dimension by the scanning laser projector; separate the light signals corresponding to the sweep of the total scan range ψ in the second dimension into the Y sub-ranges $\beta_i$ in the second dimension based on point of incidence at the optical splitter; and redirect the light signals corresponding to the sweep of the total scan range ψ in the second dimension towards the holographic combiner effectively from at least Y of the N spatially-separated virtual positions for the scanning laser projector, the particular virtual position for the scanning laser projector from which a light signal in the sweep of the total scan range ψ in the second dimension is redirected by the optical splitter determined by the particular sub-range $\beta_i$ in the second dimension to which the light signal corresponds.

The support structure may have a general shape and appearance of an eyeglasses frame. The wearable heads-up display may further include a prescription eyeglass lens. The holographic combiner may be carried by the prescription eyeglass lens.

The at least one hologram of the holographic combiner may converge light signals to respective ones of N exit pupils at or proximate the eye of the user, the particular exit pupil determined by the particular virtual position for the scanning laser projector from which a light signal is redirected by the optical splitter. The holographic combiner may include at least N multiplexed holograms, and each one of the at least N multiplexed holograms may converge light signals corresponding to a respective one of the N spatially-separated virtual positions for the scanning laser projector to a respective one of the N exit pupils at or proximate the eye of the user. The scanning laser projector may include a red laser diode, a green laser diode, and a blue laser diode, and the holographic combiner may include a wavelength-multiplexed holographic combiner that includes at least one red hologram, at least one green hologram, and at least one blue hologram. In this case, for a light signal redirected from a particular one of the N spatially-separated virtual positions for the scanning laser projector by the optical splitter, the at least one red hologram may converge a red component of the light signal to a particular one of the N exit pupils at or proximate the eye of the user, the at least one green hologram may converge a green component of the light signal to the particular one of the N exit pupils at or proximate the eye of the user, and the at least one blue hologram may converge a blue component of the light signal to the particular one of the N exit pupils at or proximate the eye of the user. The holographic combiner may include a wavelength-multiplexed and angle-multiplexed holographic combiner that includes at least N angle-multiplexed red holograms, at least N angle-multiplexed green holograms, and at least N angle-multiplexed blue holograms. In this case, each one of the at least N angle-multiplexed red holograms may converge red components of light signals redirected from a respective one of the N spatially-separated virtual positions for the scanning laser projector by the optical splitter to a respective one of the N exit pupils at or proximate the eye of the user, each one of the at least N angle-multiplexed green holograms may converge green components of light signals redirected from a respective one of the N spatially-separated virtual positions for the scanning laser projector by the optical splitter to a respective one of the N exit pupils at or proximate the eye of the user, and each one of the at least N angle-multiplexed blue holograms may converge blue components of light signals redirected from a respective one of the N spatially-separated virtual positions for the scanning laser projector by the optical splitter to a respective one of the N exit pupils at or proximate the eye of the user.

At least one of the scanning laser projector and/or the optical splitter may be physically movable and/or rotatable on the support structure, and physical movement and/or rotation of the scanning laser projector and/or optical splitter may change a position of at least one of the N exit pupils relative to the eye of the user.

The light signal may include an image comprising at least two pixels.

At least one optical element of the optical splitter may be arranged to receive N light signals generated by the scanning laser projector and redirect the N light signals towards the holographic combiner effectively from respective ones of the N spatially-separated virtual positions for the scanning laser projector, the particular virtual position for the scanning laser projector from which each one of the N light signals is redirected by the optical splitter determined by a respective point of incidence at which each light signal is received by the optical splitter. The holographic combiner may include at least one hologram positioned and oriented to converge each one of the N light signals to a respective exit pupil at or proximate the eye of the user. The N light signals may include N different instances of a same image, or the N light signals may include N different instances of a same pixel of an image.

The optical splitter may include a faceted optical structure with at least N facets. At least one respective facet may correspond to each respective one of the N spatially-separated virtual positions for the scanning laser projector.

A wearable heads-up display may be summarized as including: a support structure that in use is worn on a head of a user; a scanning laser projector carried by the support structure and having a total two-dimensional scan range $\theta$; a holographic combiner carried by the support structure, wherein the holographic combiner is positioned within a field of view of an eye of the user when the support structure is worn on the head of the user; an optical splitter carried by the support structure and positioned in an optical path between the scanning laser projector and the holographic combiner, wherein the optical splitter comprises at least one optical element arranged to: receive light signals corresponding to a sweep of the total two-dimensional scan range $\theta$ by the scanning laser projector; separate the light signals into N two-dimensional sub-ranges $\varphi_i$ based on point of incidence at the optical splitter, where N is an integer greater than 1 and $$\sum_{i=1}^{N} \varphi_i = \theta;$$

and redirect the light signals towards the holographic combiner, and wherein the holographic combiner comprises at least one hologram positioned and oriented to converge light signals to respective ones of N exit pupils at or proximate the eye of the user, the particular exit pupil towards which a light signal is redirected by the holographic combiner determined by the particular two-dimensional sub-range $\varphi_i$ into which the light signal is separated by the optical splitter.

The total two-dimensional scan range $\theta$ of the scanning laser projector may include a total scan range $\Omega$ in a first dimension, where $0°<\Omega<180°$, and at least one element of the optical splitter may be arranged to: receive light signals corresponding to at least one sweep of the total scan range $\Omega$ in the first dimension by the scanning laser projector; separate the light signals into X sub-ranges $\omega_i$ in the first dimension based on point of incidence at the optical splitter, where $1<X\leq N$ and $$\sum_{i=1}^{X} \omega_i = \Omega;$$

and redirect the light signals towards the holographic combiner, and wherein at least one hologram of the holographic combiner is positioned and oriented to converge the light signals to respective ones of at least X of the N exit pupils at or proximate the eye of the user, the particular exit pupil towards which a light signal is redirected by the holographic combiner determined by at least the particular sub-range $\omega_i$ in the first dimension into which the light signal is separated by the optical splitter.

The total two-dimensional scan range $\theta$ of the scanning laser projector may include a total scan range $\psi$ in a second dimension, where $0°<\psi<180°$, and at least one optical element of the optical splitter may be arranged to: receive light signals corresponding to at least one sweep of the total scan range $\psi$ in the second dimension by the scanning laser projector; separate the light signals corresponding to the at least one sweep of the total scan range $\psi$ in the second dimension into Y sub-ranges $\beta_i$ in the second dimension based on point of incidence at the optical splitter, where $1<Y\leq N$ and $$\sum_{i=1}^{Y} \beta_i = \psi;$$

and redirect the light signals corresponding to the at least one sweep of the total scan range $\psi$ in the second dimension towards the holographic combiner, and wherein at least one hologram of the holographic combiner is positioned and oriented to converge the light signals corresponding to the at least one sweep of the total scan range $\psi$ in the second dimension to different ones of the N exit pupils at or proximate the eye of the user, the particular exit pupil towards which a light signal is redirected by the holographic combiner determined by both the particular sub-range $\omega_i$ in the first dimension and the particular sub-range $\beta_i$ in the second dimension into which the light signal is separated by the optical splitter.

A method of operating a wearable heads-up display, the wearable heads-up display including a scanning laser projector, an optical splitter, and a holographic combiner positioned within a field of view of an eye of a user when the wearable heads-up display is worn on a head of the user, may be summarized as including: generating a first light signal by the scanning laser projector; receiving the first light signal at a first point of incidence by the optical splitter; redirecting, by the optical splitter, the first light signal towards the holographic combiner effectively from a first one of N spatially-separated virtual positions for the scanning laser projector, where N is an integer greater than 1, the first virtual position for the scanning laser projector from which the first light signal is redirected by the optical splitter determined by the first point of incidence at which the first light signal is received by the optical splitter; and redirecting the first light signal towards the eye of the user by the holographic combiner.

Redirecting the first light signal towards the eye of the user by the holographic combiner may include converging the first light signal to a first one of N exit pupils at or proximate the eye of the user by the holographic combiner, the first exit pupil to which the first light signal is converged by the holographic combiner determined by the first virtual position for the scanning laser projector from which the first light signal is redirected by the optical splitter. The holographic combiner may include at least N multiplexed holograms, and converging the first light signal to a first one of N exit pupils at or proximate the eye of the user by the holographic combiner may include converging the first light signal to the first exit pupil by a first one of the N multiplexed holograms of the holographic combiner, the first multiplexed hologram by which the first light signal is converged determined by the first virtual position for the scanning laser projector from which the first light signal is redirected by the optical splitter. The scanning laser projector may include a red laser diode, a green laser diode, and a blue laser diode, the first light signal generated by the scanning laser projector may include a red component, a green component, and a blue component, and the holographic combiner may include a wavelength-multiplexed holographic combiner that includes at least one red hologram, at least one green hologram, and at least one blue hologram. In this case, converging the first light signal to a first one of N exit pupils at or proximate the eye of the user by one of the N multiplexed holograms of the holographic combiner may include: converging a red component of the first light signal to the first exit pupil by the at least one red hologram; converging a green component of the first light signal to the first exit pupil by the at least one green hologram; and converging a blue component of the first light signal to the first exit pupil by the at least one blue hologram. The holographic combiner may include a wavelength-multiplexed and angle-multiplexed holographic combiner that includes at least N angle-multiplexed red holograms, at least N angle-multiplexed green holograms, and at least N angle-multiplexed blue holograms. In this case, converging a red component of the first light signal to the first exit pupil by the at least one red hologram may include converging the red component of the first light signal to the first exit pupil by a first one of the N angle-multiplexed red holograms, the first angle-multiplexed red hologram by which the red component of the first light signal is converged determined by the first virtual position for the scanning laser projector from which the first light signal is redirected by the optical splitter; converging a green component of the first light signal to the first exit pupil by the at least one green hologram may include converging the green component of the first light signal to the first exit pupil by a first one of the N angle-multiplexed green holograms, the first angle-multiplexed green hologram by which the green component of the first light signal is converged determined by the first virtual position for the scanning laser projector from which the first light signal is redirected by the optical splitter; and converging a blue component of the first light signal to the first exit pupil by the at least one blue hologram may include converging the blue component of the first light signal to the first exit pupil by a first one of the N angle-multiplexed blue holograms, the first angle-multiplexed blue hologram by which the blue component of the first light signal is converged determined by the first virtual position for the scanning laser projector from which the first light signal is redirected by the optical splitter.

The method may further include: generating a second light signal by the scanning laser projector; receiving the second light signal at a second point of incidence by the optical splitter; redirecting, by the optical splitter, the second light signal towards the holographic combiner effectively from a second one of the N spatially-separated virtual positions for the scanning laser projector, the second virtual position for the scanning laser projector from which the second light signal is redirected by the optical splitter determined by the second point of incidence at which the second light signal is received by the optical splitter; and converging the second light signal to a second one of the N exit pupils at or proximate the eye of the user by the holographic combiner. The scanning laser projector may have a total scan range $\theta$. Receiving the first light signal at a first point of incidence by the optical splitter may include receiving, by the optical splitter, the first light signal at a first point of incidence that is included in a first one $\varphi_1$ of N sub-ranges $\varphi_i$ of the total scan range $\theta$ for the scanning laser projector, where $$\sum_{i=1}^{N} \varphi_i = \theta.$$

Redirecting, by the optical splitter, the first light signal towards the holographic combiner effectively from a first one of N spatially-separated virtual positions for the scanning laser projector, the first virtual position for the scanning laser projector from which the first light signal is redirected by the optical splitter determined by the first point of incidence at which the first light signal is received by the optical splitter may include redirecting, by the optical splitter, the first light signal towards the holographic combiner effectively from a first one of N spatially-separated virtual positions for the scanning laser projector, the first virtual position for the scanning laser projector from which the first light signal is redirected by the optical splitter determined by the first sub-range $\varphi_1$ of the total scan range $\theta$ for the scanning laser projector. Receiving the second light signal at a second point of incidence by the optical splitter may include receiving, by the optical splitter, the second light signal at a second point of incidence that is included in a second one $\varphi_2$ of the N sub-ranges $\varphi_i$ of the total scan range $\theta$ for the scanning laser projector. Redirecting, by the optical splitter, the second light signal towards the holographic combiner effectively from a second one of the N spatially-separated virtual positions for the scanning laser projector, the second virtual position for the scanning laser projector from which the second light signal is redirected by the optical splitter determined by the second point of incidence at which the second light signal is received by the optical splitter may include redirecting, by the optical splitter, the second light signal towards the holographic combiner effectively from a second one of the N spatially-separated virtual positions for the scanning laser projector, the second virtual position for the scanning laser projector from which the second light signal is redirected by the optical splitter determined by the second sub-range $\varphi_2$ of the total scan range $\theta$ for the scanning laser projector.

Generating a first light signal by the scanning laser projector may include generating a first instance of an image by the scanning laser projector, the first instance of the image including at least two pixels.

Generating a first light signal by the scanning laser projector may include generating a first instance of a first pixel of an image by the scanning laser projector.

A method of operating a wearable heads-up display, the wearable heads-up display including a scanning laser projector, an optical splitter, and a holographic combiner positioned within a field of view of an eye of a user when the wearable heads-up display is worn on a head of the user, may be summarized as including: generating light signals by the scanning laser projector, the light signals corresponding to a sweep of the total two-dimensional scan range $\theta$ for the scanning laser projector; receiving the light signals corresponding to the sweep of the total two-dimensional scan range θ of the scanning laser projector by the optical splitter; separating, by the optical splitter, the light signals into N two-dimensional sub-ranges $\varphi_i$ based on point of incidence at the optical splitter, where N is an integer greater than 1 and $$\sum_{i=1}^{N} \varphi_i = \theta;$$

redirecting the light signals towards the holographic combiner by the optical splitter; and converging each light signal to one of N exit pupils at or proximate the eye of the user by the holographic combiner, the particular one of the N exit pupils to which a light signal is converged by the holographic combiner determined by the particular two-dimensional sub-range $\varphi_i$ into which the light signal is separated by the optical splitter. The holographic combiner may include at least N multiplexed holograms, and converging each light signal to one of N exit pupils at or proximate the eye of the user by the holographic combiner may include converging each light signal to one of the N exit pupils by one of the at least N multiplexed holograms

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 2D is an illustrative diagram of the wearable heads-up display from FIGS. 2A 2B, and 2C showing a sweep of a third sub-range $\varphi_3$ of the total scan range θ by the scanning laser projector (e.g., a partial sweep of the total scan range θ) and the corresponding redirection of light signals from the third virtual position by the optical splitter in accordance with the present systems, devices, and methods.

FIG. 3 is an illustrative diagram showing an exemplary holographic combiner in two-dimensions converging four instances of replicated (e.g., repeated) light signals to form an expanded eyebox comprising four spatially-separated exit pupils at or proximate the eye of a user in accordance with the present systems, devices, and methods.

FIG. 4 is a schematic diagram of an example of an optical splitter for separating the total scan range θ of a scanning laser projector into three sub-ranges $\varphi_1$, $\varphi_2$, and $\varphi_3$ in accordance with the present systems, devices, and methods.

DETAILED DESCRIPTION

Figure 1:
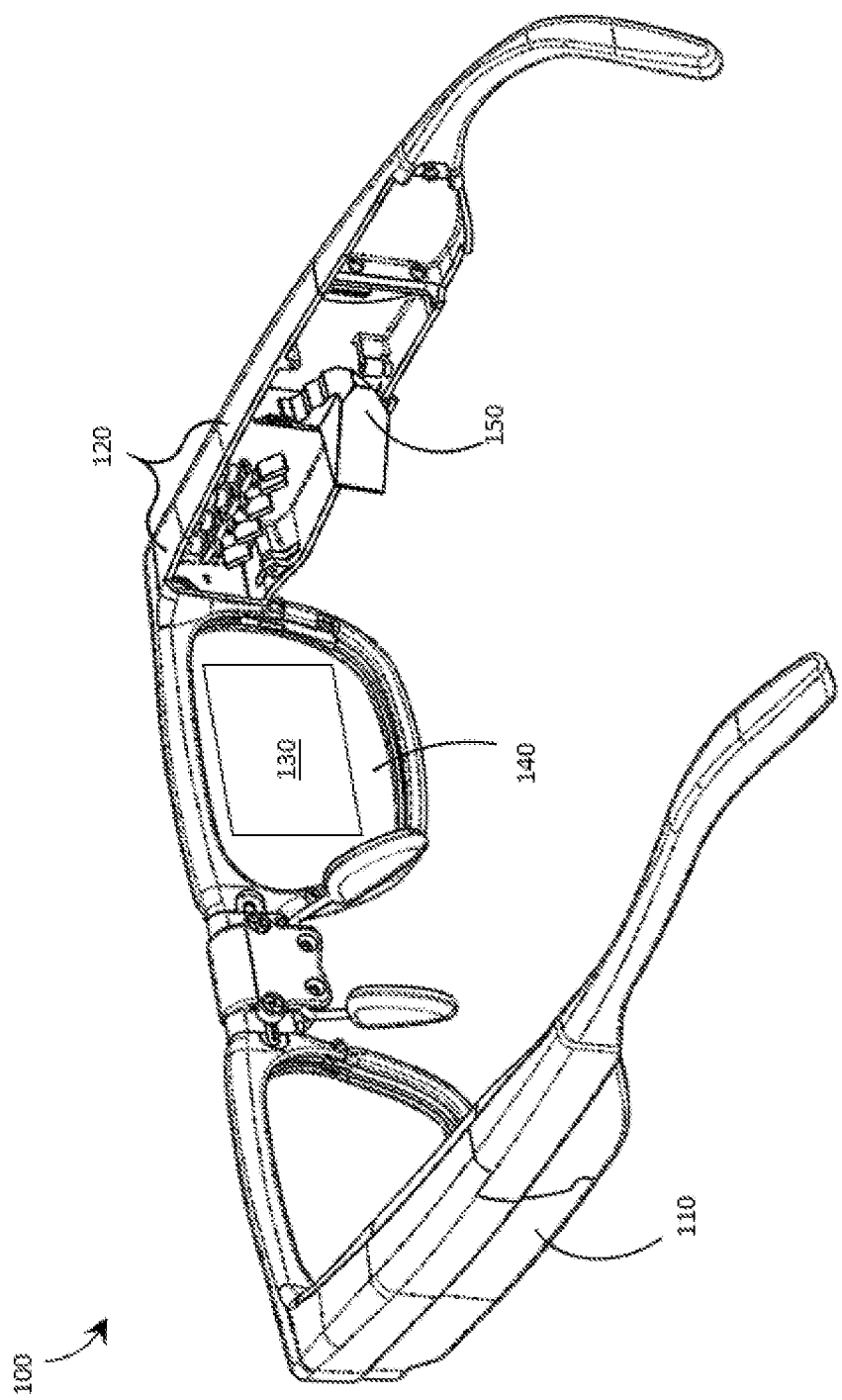
FIG. 1 is a partial-cutaway perspective view of a wearable heads-up display that provides a large eyebox made up of multiple optically-replicated exit pupils in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for eyebox expansion in scanning laser-based wearable heads-up displays ("WHUDs"). Generally, a scanning laser-based WHUD is a form of virtual retina display in which a scanning laser projector ("SLP") draws a raster scan onto the eye of the user. In the absence of any further measure the SLP projects light over a fixed area called the exit pupil of the display. In order for the user to see displayed content the exit pupil typically needs to align with, be encompassed by, or overlap with the entrance pupil of the user's eye. The full resolution and/or field of view of the display is visible to the user when the exit pupil of the display is completely contained within the entrance pupil of the eye. For this reason, a scanning laser-based WHUD typically employs a relatively small exit pupil that is equal to or smaller than the expected size of the entrance pupil of the user's eye (e.g., less than or equal to about 4 mm in diameter).

The eyebox of a scanning laser-based WHUD is defined by the geometry of the exit pupil of the display at or proximate the eye of the user. A scanning laser-based WHUD that employs a small exit pupil in order to achieve maximum display resolution and/or field of view typically has the drawback of having a relatively small eyebox. For example, the exit pupil may be aligned with the center of the user's eye so that the eye's pupil is located "within the eyebox" when the user is gazing directly ahead but the eye's pupil may quickly leave the eyebox if and when the user glances anywhere off-center. A larger eyebox may be achieved by increasing the size of the exit pupil but this typically comes at the cost of reducing the display resolution and/or field of view. In accordance with the present systems, devices, and methods, the eyebox of a scanning laser-based WHUD may be expanded by optically replicating or repeating a relatively small exit pupil and spatially distributing multiple copies or instances of the exit pupil over a relatively larger area of the user's eye, compared to the area of the single exit pupil on its own. In this way, at least one complete instance of the display exit pupil (either as a single instance in its entirety or as a combination of respective portions of multiple instances) may be contained within the perimeter of the eye's pupil for each of a range of eye positions corresponding to a range of gaze directions of the user. In other words, the present systems, devices, and methods describe eyebox expansion by exit pupil replication in scanning laser-based WHUDs.

Throughout this specification and the appended claims, the term "replication" is used (e.g., in the context of "exit pupil replication") to generally refer to situations where multiple instances of substantially the same thing (e.g., an exit pupil) are produced. The term "exit pupil replication" is intended to generally encompass approaches that produce concurrent (e.g., temporally parallel) instances of an exit pupil as well as approaches that produce sequential (e.g., temporally serial or "repeated") instances of an exit pupil. In many examples, the present systems, devices, and methods provide exit pupil replication by exit pupil repetition or sequential exit pupil tiling. Unless the specific context requires otherwise, references to "exit pupil replication" herein include exit pupil replication by exit pupil repetition.

FIG. 1 is a partial-cutaway perspective view of a WHUD 100 that provides a large eyebox made up of multiple optically-replicated exit pupils in accordance with the present systems, devices, and methods. WHUD 100 includes a support structure 110 that in use is worn on the head of a user and has a general shape and appearance of an eyeglasses (e.g., sunglasses) frame. Support structure 110 carries multiple components, including: a SLP 120, a holographic combiner 130, and an optical splitter 150. Portions of SLP 120 and optical splitter 150 may be contained within an inner volume of support structure 110; however, FIG. 1 provides a partial-cutaway view in which regions of support structure 110 have been removed in order to render visible portions of SLP 120 and optical splitter 150 that may otherwise be concealed.

Throughout this specification and the appended claims, the term "carries" and variants such as "carried by" are generally used to refer to a physical coupling between two objects. The physical coupling may be direct physical coupling (i.e., with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, and/or supported by, with or without any number of intermediary physical objects therebetween.

SLP 120 may include multiple laser diodes (e.g., a red laser diode, a green laser diode, and/or a blue laser diode) and at least one scan mirror (e.g., a single two-dimensional scan mirror or two one-dimensional scan mirrors, which may be, e.g., MEMS-based or piezo-based). SLP 120 may be communicatively coupled to (and support structure 110 may further carry) a processor and a non-transitory processor-readable storage medium or memory storing processor-executable data and/or instructions that, when executed by the processor, cause the processor to control the operation of SLP 120. For ease of illustration, FIG. 1 does not call out a processor or a memory.

Holographic combiner 130 is positioned within a field of view of at least one eye of the user when support structure 110 is worn on the head of the user. Holographic combiner 130 is sufficiently optically transparent to permit light from the user's environment (i.e., "environmental light") to pass through to the user's eye. In the illustrated example of FIG. 1, support structure 110 further carries a transparent eyeglass lens 140 (e.g., a prescription eyeglass lens) and holographic combiner 130 comprises at least one layer of holographic material that is adhered to, affixed to, laminated with, carried in or upon, or otherwise integrated with eyeglass lens 140. The at least one layer of holographic material may include a photopolymer film such as Bayfol®HX available from Bayer MaterialScience AG or a silver halide compound and may, for example, be integrated with transparent lens 140 using any of the techniques described in U.S. Provisional Patent Application Ser. No. 62/214,600. Holographic combiner 130 includes at least one hologram in or on the at least one layer of holographic material. With holographic combiner 130 positioned in a field of view of an eye of the user when support structure 110 is worn on the head of the user, the at least one hologram of holographic combiner 130 is positioned and oriented to redirect light originating from SLP 120 towards the eye of the user. In particular, the at least one hologram is positioned and oriented to receive light signals that originate from SLP 120 and converge those light signals to at least one exit pupil at or proximate the eye of the user.

Optical splitter 150 is positioned in an optical path between SLP 120 and holographic combiner 130. Optical splitter 150 comprises at least one optical element (e.g., at least one lens, reflector, partial reflector, prism, diffractor, diffraction grating, mirror, or other optical element, or at least one configuration, combination, and/or arrangement of such) that is arranged to receive light signals generated and output by SLP 120 and redirect each such light signal towards holographic combiner 130 effectively from one of multiple (e.g., N, where N is an integer greater than 1) spatially-separated "virtual positions" for SLP 120. Advantageously, optical splitter 150 may be a static and passive component that, without power consumption or any moving parts, receives (at a first point of incidence therein or thereon) a first light signal generated by SLP 120 and routes/redirects the first light signal along an optical path towards holographic combiner 130 that traces back to (if optical splitter 150 is ignored during trace back) one of N spatially-separated virtual positions for SLP 120. The particular one of the N spatially-separated virtual positions for SLP 120 from which the first light signal is redirected by optical splitter 150 is determined by the first point of incidence at which the first light signal is received by optical splitter 150. In other words, from the point of view of holographic combiner 130, optical splitter 150 causes at least some light signals generated by SLP 120 to appear to originate (i.e., "effectively" originate) from N spatially-separated "virtual positions" for SLP 120 as opposed to from the real position for SLP 120.

Throughout this specification and the appended claims, reference is often made to one or more "virtual position(s)" such as "N spatially-separated virtual positions for a SLP." The "real position" of an object is its actual position in real, three dimensional space. A "virtual position" of an object is a position in real space at which the optics of a system cause light from the object to effectively originate even though the real position of the object may be elsewhere. In other words, the optics of the system cause light from the object to follow optical paths that would trace back, if the optics of the system were ignored during the trace back, to a "virtual position" in space that is spatially-separated from the object's "real position" in space. As a simple example, an object in front of a planar mirror has a "virtual position" on the other side of the planar mirror. A "virtual position" may be a result of one or more intervening optical element(s) in an optical path. When one or more optical element(s) redirects light signals from a SLP, a virtual position for the SLP refers to the position in real space at which the SLP would need to be located in order to provide light signals having that same trajectory without any intervening optics. The optics of the system cause the light signals to follow a trajectory that would correspond to a different point of origin if there were no such optics in the system. The light signals appear to have "effectively" originated from a different, or "virtual," position for the SLP.

Figure 2A:
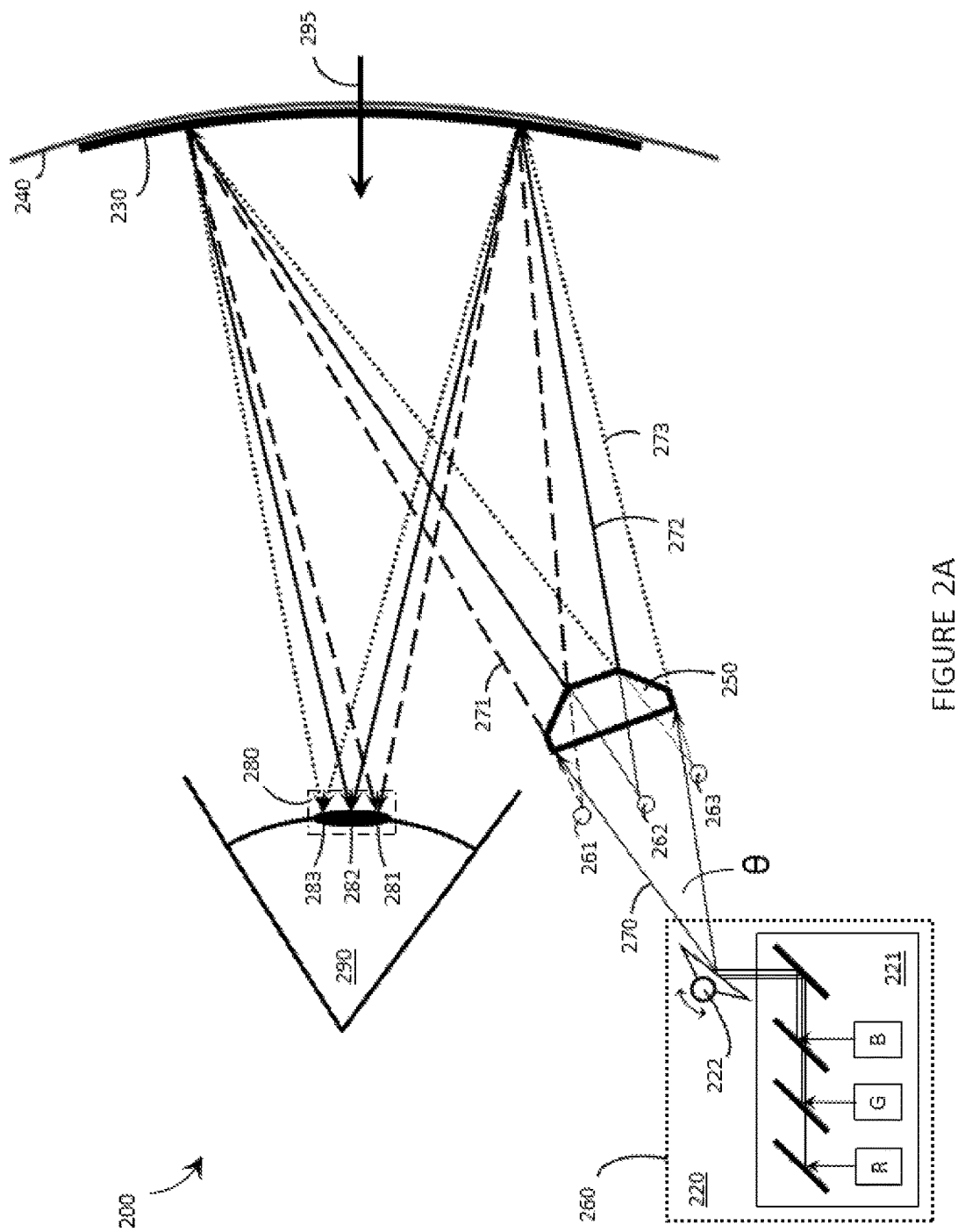
FIG. 2A is an illustrative diagram of a wearable heads-up display showing an optical splitter in operation for the purpose of eyebox expansion by exit pupil replication in accordance with the present systems, devices, and methods.

FIG. 2A is an illustrative diagram of a WHUD 200 showing an optical splitter 250 in operation for the purpose of eyebox expansion by exit pupil replication in accordance with the present systems, devices, and methods. WHUD 200 may be substantially similar to WHUD 100 from FIG. 1, although in FIG. 2A no support structure (e.g., support structure 110) is illustrated in order to reduce clutter. As with WHUD 100, WHUD 200 comprises a SLP 220 (which includes a RGB laser module 221 and at least one MEMS-based scan mirror 222), a holographic combiner 230 carried by an eyeglass lens 240, and the optical splitter 250. As previously described, the combination of holographic combiner 230 and eyeglass lens 240 is sufficiently transparent to allow environmental light 295 to pass through to the eye 290 of the user.

SLP 220 is located at a position 260 (i.e., a "real" position) relative to holographic combiner 230 and is shown generating (e.g., projecting) a set of light signals 270. Light signals 270 correspond to a first sweep of a total scan range (e.g., a total two-dimensional scan range, with only one dimension visible in the view of FIG. 2A) $\theta$ by SLP 220 and may collectively represent, for example, a projection by SLP 220 of a first image, or a first frame of a video, or generally a first frame of display content for WHUD 200.

Optical splitter 250 is positioned in an optical path between SLP 220 and holographic combiner 230 such that optical splitter 250 interrupts (e.g., receives) light signals 270 en route from SLP 220 to holographic combiner 230. As previously described, optical splitter 250 includes at least one optical element (e.g., at least one lens, reflector, partial reflector, prism, diffractor, diffraction grating, mirror, or other optical element, or at least one configuration, combination, and/or arrangement of such) that is arranged to redirect light signals 270 towards holographic combiner 230 effectively from N spatially-separated virtual positions 261, 262, and 263 for SLP 220. Particularly, optical splitter 250 separates, divides, branches, furcates, or generally "splits" light signals 270 into N groups, sets, ranges, or "sub-ranges" and redirects each sub-range of light signals 270 along a respective range (or sub-range) of optical paths that effectively originates from a respective one of the N spatially-separated virtual positions 261, 262, and 263 for SLP 220.

In operation, scan mirror 222 of SLP 220 projects, guides, directs, or generally "sweeps" modulated light signals 270 over a range (or combination of ranges) of directions and/or angles in order to define a display image. A single scan mirror 222 is shown in FIG. 2A for simplicity though in alternative implementations an arrangement of two or more scan mirrors may be employed. The total range of available directions and/or angles over which SLP 220 (e.g., at least one scan mirror 222 of SLP 220) is operative to project light signals 270 is generally referred to herein as the total "scan range" and is denoted in FIG. 2A by the symbol $\theta$. Throughout this specification and the appended claims, the symbol $\theta$ is used to represent the total scan range (e.g., the total two-dimensional scan range) of a SLP (e.g., SLP 220) and includes all available directions and/or angles at which the SLP is operative to output light signals during normal use. Depending on the specific display content being projected by the SLP (e.g., depending on the specific modulation pattern of laser module 221), any particular direction and/or angle in the total scan range $\theta$ may correspond to any particular light signal (e.g., a red light signal, a green light signal, a blue light signal, any combination thereof, or no light signal at all) at any particular time. One "sweep" of the total scan range $\theta$ of a SLP 220 may produce one projected image, or one frame of a projected video or animation, or generally one frame of display content, where the composition of the display content depends on the modulation pattern of laser module 221 during the sweep. The SLPs described herein are generally operative to draw a raster scan and the "total scan range" generally encompasses the outer perimeter of the full raster scan that the SLP is operative to draw. This may be accomplished by, for example, a SLP that employs a single scan mirror operative to scan in two orthogonal dimensions or two separate scan mirrors that are each operative to scan in a respective one of two orthogonal dimensions.

The total two-dimensional scan range $\theta$ of a SLP may be broken down into a total scan range $\Omega$ in a first dimension corresponding to all available directions and/or angles of light signals in a first dimension (e.g., the horizontal dimension) that the SLP is operative to output during normal use, and a total scan range $\psi$ in a second dimension corresponding to all available directions and/or angles of light signals in a second dimension (e.g., the vertical dimension) that the SLP is operative to output during normal use. Generally, $0° < \Omega < 180°$ and $0° < \psi < 180°$, although in practice $\Omega$ and $\psi$ may each be within a narrower range, such as $10° < \Omega < 60°$, and $10° < \psi < 60°$. The relative values of $\Omega$ and $\psi$ influence the aspect ratio of the WHUD. In other words, the total two-dimensional scan range θ may be made up of a first one-dimensional component Ω and a second (e.g., orthogonal) one-dimensional component ψ, as θ=Ω×ψ. Generally, one "sweep" of a total scan range in a single dimension by a SLP refers to one instance of the scan mirror(s) of the SLP moving through all orientations or configurations that correspond to all available directions/angles for light signals in the dimension associated with that scan range. A sweep of the total scan range Ω in the first dimension by the SLP therefore corresponds to a sweep (e.g., by at least one scan mirror of the SLP) over or across all orientations or configurations that correspond to all available directions/angles for light signals in that first dimension and a sweep of the total scan range ψ in the second dimension by the SLP therefore corresponds to a sweep (e.g., by at least one scan mirror of the SLP) over or across all orientations or configurations that correspond to all available directions/angles for light signals in that second dimension. A sweep of a total two-dimensional scan range θ, however, may involve multiple sweeps of the total scan ranges Ω and ψ in each of the first and the second dimensions, respectively. A common mode of operation for a SLP is to perform a respective sweep of the total scan range Ω in a first dimension (e.g., the horizontal dimension) at each discrete step or position along a sweep of the total scan range ψ in a second dimension (e.g., the vertical dimension). Whether or not a light signal is actually projected at any given direction/angle depends on the modulation pattern for the particular display content being projected at that time.

Figure 2B:
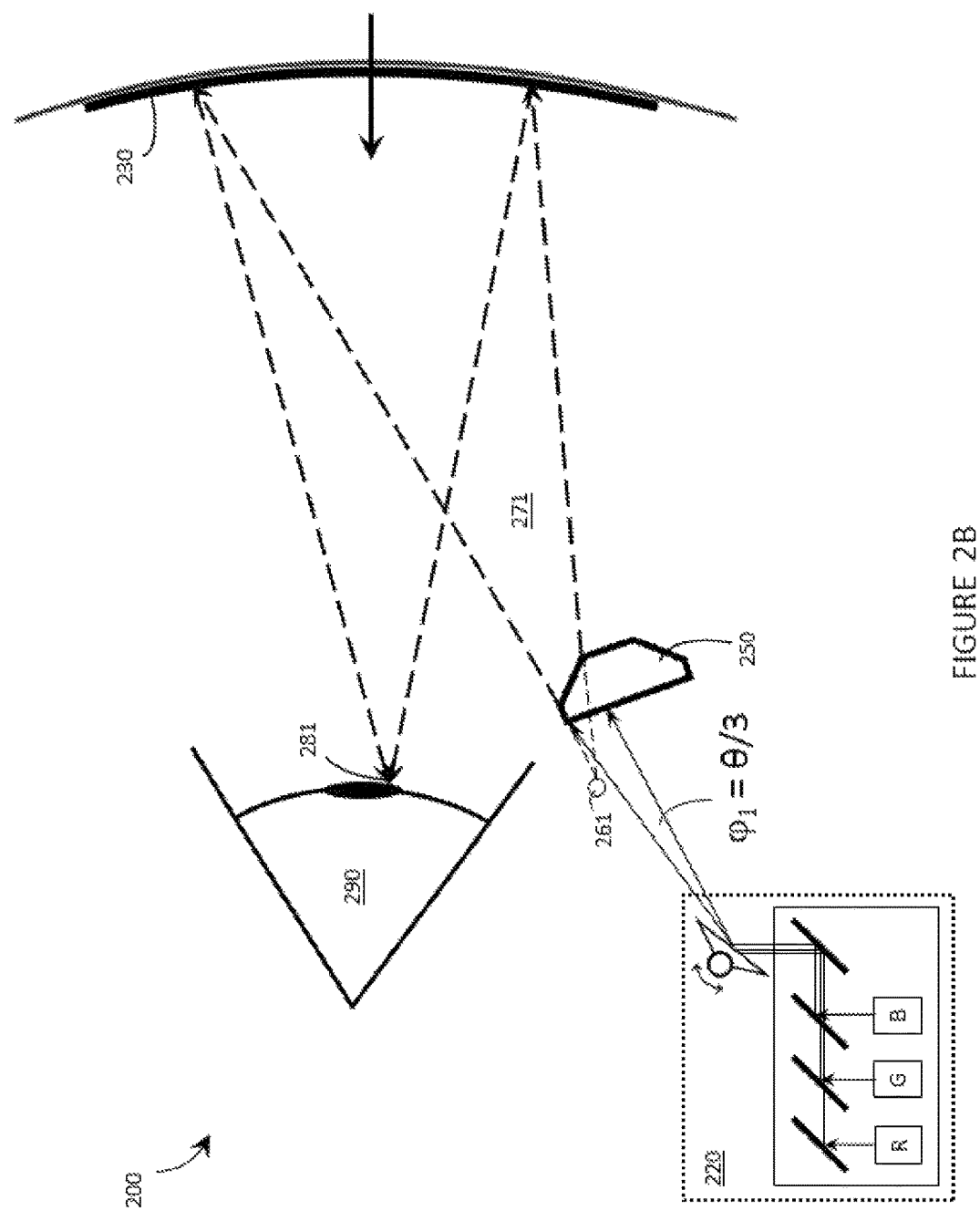
FIG. 2B is an illustrative diagram of the wearable heads-up display from FIG. 2A showing a sweep of a first sub-range $\varphi_1$ of the total scan range θ by the scanning laser projector (e.g., a partial sweep of the total scan range θ) and the corresponding redirection of light signals from the first virtual position by the optical splitter in accordance with the present systems, devices, and methods.
Figure 2C:
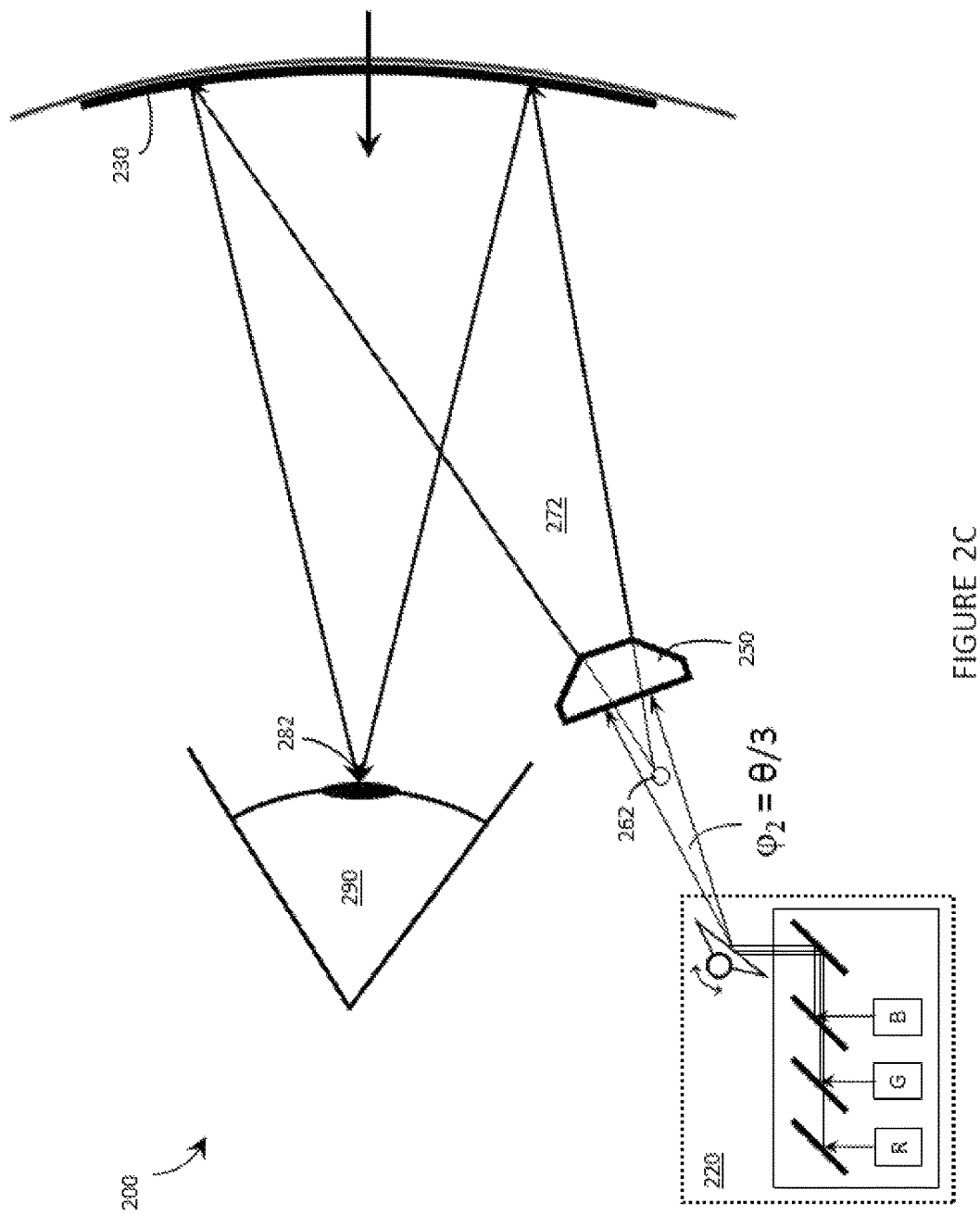
FIG. 2C is an illustrative diagram of the wearable heads-up display from FIGS. 2A and 2B showing a sweep of a second sub-range $\varphi_2$ of the total scan range θ by the scanning laser projector (e.g., a partial sweep of the total scan range θ) and the corresponding redirection of light signals from the second virtual position by the optical splitter in accordance with the present systems, devices, and methods.

Returning to FIG. 2A, optical splitter 250 includes at least one optical element that is arranged to receive light signals 270 corresponding to a sweep of the total scan range θ by SLP 220, separate the light signals into N sub-ranges $\varphi_i$ based on the point of incidence of each light signal 270 at optical splitter 250, where $$\sum_{i=1}^{N} \varphi_i = \theta,$$

and redirect the light signals towards holographic combiner 230 effectively from each of the N spatially-separated virtual positions 261, 262, and 263 for SLP 220. Each one of the N sub-ranges $\varphi_i$ may correspond to a respective one of the N spatially-separated virtual positions 261, 262, and 263 for SLP 220. The particular one of the N virtual positions 261, 262, and 263 for SLP 220 from which each light signal 270 in the sweep of the total scan range θ is redirected by optical splitter 250 is determined by the particular one of the N sub-ranges $\varphi_i$ to which the light signal 270 corresponds. In the view of the illustrated example, N=3 sub-ranges (e.g., $\varphi_1$, $\varphi_2$, and $\varphi_3$ respectively, but not individually called out to reduce clutter) and each sub-range includes a respective set of light signals 271, 272, and 273 that together make up light signals 270. That is, optical splitter 250 splits or separates light signals 270 into a first sub-range $\varphi_1$ comprising light signals 271 (represented by lines with large dashes), a second sub-range $\varphi_2$ comprising light signals 272 (represented by solid lines), and a third sub-range $\varphi_3$ comprising light signals 273 (represented by dotted lines). Optical splitter 250 redirects the light signals so that first light signals 271 effectively originate from first virtual position 261, second light signals 272 effectively originate from second virtual position 262, and third light signals 273 effectively originate from third virtual position 263. Successive individual ones of the N=3 sub-ranges $\varphi_1$, $\varphi_2$, and $\varphi_3$ corresponding to respective ones of first light signals 271, second light signals 272, and third light signals 273 are depicted in FIGS. 2B, 2C, and 2D respectively.

Each of the N=3 virtual positions 261, 262, and 263 for SLP 220 is spatially-separated from real position 260 for SLP 220, so the optical paths between each of virtual positions 261, 262, and 263 for SLP 220 (corresponding to first light signal 271, second light signals 272, and third light signals 273, respectively) and holographic combiner 230 are different from the optical paths between real position 260 for SLP 220 and holographic combiner 230. For example, the optical paths of light signals 271 are different from the optical paths of light signals 272 and the optical paths of light signals 273 are different from the optical paths of both light signals 271 and light signals 272. Advantageously, each of the N=3 virtual positions 261, 262, and 263, for SLP 220 may correspond to a respective position and orientation of SLP 220. In other words, relative to the other ones of the N=3 virtual positions 261, 262, and 263 for SLP 220, each one of the virtual positions 261, 262, and 263 may correspond to a respective displacement and rotation of SLP 220. Such is the case in WHUD 200 for which, as would be apparent to one of ordinary skill in the art, a line connecting each of the N=3 virtual positions 261, 262, and 263 for SLP 220 in FIG. 2A would be a curved line.

As previously described, holographic combiner 230 includes at least one hologram that is operative (e.g., designed, crafted, encoded, recorded, and/or generally positioned and oriented) to redirect light signals 270 received from optical splitter 250 towards the eye 290 of the user. In the illustrated implementation, the at least one hologram of holographic combiner 230 converges respective ones of light signals 271, 272, and 273 to respective ones of N=3 exit pupils 281, 282, and 283 at or proximate eye 290. The particular exit pupil 281, 282, and 283 to which a light signal is converged by holographic combiner 230 depends on (e.g., is determined by) the particular virtual position 261, 262, and 263 for SLP 220 from which the light signal is redirected by optical splitter 250. Thus, optical splitter 250 splits light signals 270 into N=3 groups (light signals 271, 272, and 273) or sub-ranges ($\varphi_1$, $\varphi_2$, and $\varphi_3$) and redirects each group or sub-range to holographic combiner 230 in such a way (e.g., effectively from such a virtual position) that each group or sub-range is converged by holographic combiner 230 to a respective one of N=3 spatially-separated exit pupils 281, 282, and 283 at eye 290. The total eyebox 280 of WHUD 200 encompasses all three spatially-separated exit pupils 281, 282, and 283. If optical splitter 250 was not present then the total eyebox 280 of WHUD 200 would be composed of a single exit pupil (e.g., 282). Optical splitter 250 expands the eyebox 280 of WHUD 200 by breaking up (or "splitting") the total scan range θ of SLP 220 into N=3 sub-ranges $\varphi_i$ and, correspondingly, replicating or repeating a single exit pupil (e.g., 282) as N=3 exit pupils 281, 282, and 283 over a larger spatial area at eye 290. As will be discussed in more detail later on, in order to replicate the same display content at each exit pupil 281, 282, and 283, SLP 220 may re-modulate nominally the same display content N times (e.g., repeated as N instances of nominally the same modulation pattern) in a sweep of the total scan range θ with each respective modulation (e.g., each one of the N instances) corresponding to a respective one of the N sub-ranges $\varphi_i$ of the total scan range θ. N=3 sub-ranges $\varphi_1$, $\varphi_2$, and $\varphi_3$ and N=3 exit pupils 281, 282, and 283 are used as illustrative examples only in FIG. 2A. A person of skill in the art will appreciate that in alternative implementations N may be any other integer greater than 1, such as N=2, 4, 5, 6, and so on.

Generally, a sweep of the total scan range θ by SLP 220 may include more (e.g., significantly more, such as on the order of tens more, hundreds more, thousands more, or even greater) than N light signals. Within such a sweep, at least one optical element of optical splitter 250 may be arranged to receive at least N light signals generated by SLP 220 and redirect at least N light signals towards holographic combiner 230 effectively from respective ones of the N spatially-separated virtual positions for SLP 220. In this case, each one of the N light signals is in a respective one of the N sub-ranges $\varphi_i$ of the total scan range θ. That is, a first one of the N light signals is in a first one of the N sub-ranges $\varphi_1$ (e.g., one of light signals 271) and is redirected by optical splitter 250 to effectively originate from first virtual position 261 for SLP 220, a second one of the N light signals is in a second one of the N sub-ranges $\varphi_2$ (e.g., one of light signals 272) and is redirected by optical splitter 250 to effectively originate from second virtual position 262 for SLP 220, and a third one of the N light signals is in a third one of the N sub-ranges $\varphi_3$ (e.g., one of light signals 273) and is redirected by optical splitter 250 to effectively originate from third virtual position 263 for SLP 220, and so on as appropriate to the specific implementation (e.g., for all N). The particular virtual position 261, 262, and 263 for SLP 220 from which each one of the N light signals is redirected by optical splitter 250 depends on (e.g., is determined by) the particular point of incidence at which each light signal is received by optical splitter 250. Holographic combiner 230 receives the N light signals from optical splitter 250 and converges each one of the N light signals to a respective spatially-separated exit pupil 281, 282, and 283 at or proximate eye 290. In this example, the N light signals may include, for example, N different instances of a same image (i.e., N repeated or replicated instances of the same image comprising at least two pixels) or the N light signals may include, for example, N different instances of a same pixel of an image (e.g., N repeated or replicated instances of the same pixel in the same image).

FIG. 2A depicts an illustrative example of a sweep of the total scan range (e.g., the total two-dimensional scan range, with only one dimension visible in the view of FIG. 2A) θ by SLP 220. As described previously, FIGS. 2B, 2C, and 2D respectively depict successive ones of the N=3 sub-ranges $\varphi_1$, $\varphi_2$, and $\varphi_3$ that make up the sweep of the total scan range θ of SLP 220 from FIG. 2A.

FIG. 2B is an illustrative diagram of WHUD 200 from FIG. 2A showing a sweep of a first sub-range $\varphi_1$ of the total scan range θ by SLP 220 (e.g., a partial sweep of the total scan range θ) and the corresponding redirection of light signals 271 from first virtual position 261 by optical splitter 250 in accordance with the present systems, devices, and methods. In the illustrated example, first sub-range $\varphi_1$ corresponds to the light signals 271 (represented by lines with large dashes in both FIG. 2B and FIG. 2A) generated by SLP 220 over the first third of the total scan range θ, therefore $\varphi_1$=θ/3. For the range of directions and/or angles of light signals 271 in first sub-range $\varphi_1$, optical splitter 250 receives light signals 271 at various points of incidence over a first range of points of incidence. Based at least in part on the positions/locations of the points of incidence in the first range of points of incidence, optical splitter 250 redirects light signals 271 towards holographic combiner 230 effectively from first virtual position 261 for SLP 220. Holographic combiner 230 receives light signals 271 in first sub-range $\varphi_1$ from optical splitter 250 and converges light signals 271 to first exit pupil 281 at or proximate eye 290.

FIG. 2C is an illustrative diagram of WHUD 200 from FIGS. 2A and 2B showing a sweep of a second sub-range $\varphi_2$ of the total scan range θ by SLP 220 (e.g., a partial sweep of the total scan range θ) and the corresponding redirection of light signals 272 from second virtual position 262 by optical splitter 250 in accordance with the present systems, devices, and methods. In the illustrated example, second sub-range $\varphi_2$ corresponds to the light signals 272 (represented by solid lines in both FIG. 2C and FIG. 2A) generated by SLP 220 over the second third of the total scan range θ, therefore $\varphi_2$=θ/3. For the range of directions and/or angles of light signals 272 in second sub-range $\varphi_2$, optical splitter 250 receives light signals 272 at various points of incidence over a second range of points of incidence. Based at least in part on the positions/locations of the points of incidence in the second range of points of incidence, optical splitter 250 redirects light signals 272 towards holographic combiner 230 effectively from second virtual position 262 for SLP 220. Holographic combiner 230 receives light signals 272 in second sub-range $\varphi_2$ from optical splitter 250 and converges light signals 272 to second exit pupil 282 at or proximate eye 290. Because second virtual position 262 is spatially-separated from first virtual position 261, second exit pupil 282 is spatially-separated from first exit pupil 281 at or proximate eye 290.

FIG. 2D is an illustrative diagram of WHUD 200 from FIGS. 2A 2B, and 2C showing a sweep of a third sub-range $\varphi_3$ of the total scan range θ by SLP 220 (e.g., a partial sweep of the total scan range θ) and the corresponding redirection of light signals 273 from third virtual position 263 by optical splitter 250 in accordance with the present systems, devices, and methods. In the illustrated example, third sub-range $\varphi_3$ corresponds to the light signals 273 (represented by dotted lines in both FIG. 2D and FIG. 2A) generated by SLP 220 over the last third of the total scan range θ, therefore $\varphi_3$=θ/3. For the range of directions and/or angles of light signals 273 in third sub-range $\varphi_3$, optical splitter 250 receives light signals 273 at various points of incidence over a third range of points of incidence. Based at least in part on the positions/locations of the points of incidence in the third range of points of incidence, optical splitter 250 redirects light signals 273 towards holographic combiner 230 effectively from third virtual position 263 for SLP 220. Holographic combiner 230 receives light signals 273 in third sub-range $\varphi_3$ from optical splitter 250 and converges light signals 273 to third exit pupil 283 at or proximate eye 290. Because third virtual position 263 is spatially-separated from both first virtual position 261 and second virtual position 262, third exit pupil 283 is spatially-separated from both first exit pupil 281 and second exit pupil 282 at or proximate eye 290.

Throughout this specification and the appended claims, reference is often made to "points of incidence" of one or more light signal(s) at an optical splitter. Unless the specific context requires otherwise, a "point of incidence" at an optical splitter generally refers to the position or location on (e.g., at an outer surface of) or in (e.g., within an inner volume of) the optical splitter at which a light signal impinges on and/or first interacts with and/or is first influenced by the optical splitter. For example, an optical splitter as described herein may include one or more optical elements, such as an arrangement of optical elements, and the "point of incidence" of a light signal at the optical splitter may refer to the position or location (e.g., the spatial "point") at which the light signal first impinges on an optical element in the arrangement of optical elements. The term "point" is used loosely in this context to refer to a general region having a particular spatial position and/or location and may include some dimensional attribute(s) (e.g., a finite length, area, or volume) depending on the spot size and spot geometry of the light signal at the point of incidence. In other words, the term "point" in this context is not intended to be limited to the mathematical notion of a dimensionless point in space.

In the illustrated examples of FIGS. 2B, 2C, and 2D, each of sub-ranges $\varphi_1$, $\varphi_2$, and $\varphi_3$ corresponds to a respective equal portion (e.g., a respective third) of total scan range $\theta$. Optical splitter 250 separates or "splits" light signals 270 from the sweep of the total scan range $\theta$ by SLP 220 into N=3 equal-sized sub-ranges: light signals 271 (FIG. 2B) corresponding to first sub-range $\varphi_1=\theta/3$, light signals 272 (FIG. 2C) corresponding to second sub-range $\varphi_2=\theta/3$, and light signals 273 (FIG. 2D) corresponding to third sub-range $\varphi_3=\theta/3$. That is, for a first range of points of incidence at optical splitter 250 corresponding to all directions and/or angles of light signals 271 projected by SLP 220 in first sub-range $\varphi_1=\theta/3$ of the total scan range $\theta$, at least one optical element of optical splitter 250 receives light signals 271 and redirects (either on its own or in combination with other optical elements) light signals 271 towards holographic combiner 230 effectively from first virtual position 261 for SLP 220; for a second range of points of incidence at optical splitter 250 corresponding to all directions and/or angles of light signals 272 projected by SLP 220 in second sub-range $\varphi_2=\theta/3$ of the total scan range $\theta$, at least one optical element of optical splitter 250 receives light signals 272 and redirects (either on its own or in combination with other optical elements) light signals 272 towards holographic combiner 230 effectively from second virtual position 262 for SLP 220; and for a third range of points of incidence at optical splitter 250 corresponding to all directions and/or angles of light signals 273 projected by SLP 220 in third sub-range $\varphi_3=\theta/3$ of the total scan range $\theta$, at least one optical element of optical splitter 250 receives light signals 273 and redirects (either on its own or in combination with other optical elements) light signals 273 towards holographic combiner 230 effectively from third virtual position 263 for SLP 220. Each of the N=3 sub-ranges $\varphi_1$, $\varphi_2$, and $\varphi_3$ in WHUD 200 corresponds to a respective equal portion (e.g., a respective third) of total scan range $\theta$ for illustrative purposes only. A person of skill in the art will appreciate that alternative implementations of an optical splitter (and/or alternative implementations of a WHUD employing an optical splitter) may include any number N of sub-ranges $\varphi_i$ and the sub-ranges $\varphi_i$ may or may not be equally-sized. At least two sub-ranges $\varphi_i$ may be the same size and/or at least two sub-ranges $\varphi_i$ may be different respective sizes. For example, if desired an optical splitter with N=3 may split light signals into three sub-ranges $\varphi_1$, $\varphi_2$, and $\varphi_3$ of sizes $\varphi_1=\theta/6$, $\varphi_2=2(\theta/3)$, and $\varphi_3=\theta/6$.

As previously described, over each sub-range $\varphi_i$ SLP 220 may re-modulate nominally the same pattern or arrangement of light signals. An example of such is now described.

Over a sweep of the total scan range $\theta$ by SLP 220, SLP 220 may produce light signals 270. Light signals 270 may comprise first light signals 271, second light signals 272, and third light signals 273.

Over first sub-range $\varphi_1$ of total scan range $\theta$, SLP 220 may generate first light signals 271 and first light signals 271 may represent or embody a first set of pixels corresponding to a first image or a first portion of an image. First light signals 271 are redirected by optical splitter 250 towards holographic combiner 230 along optical paths that trace back to effectively originate from first virtual position 261 for SLP 220. Holographic combiner 230 receives first light signals 271 and converges first light signals 271 to first exit pupil 281 at eye 290.

Over second sub-range $\varphi_2$ of total scan range $\theta$, SLP 220 may generate second light signals 272 and second light signals 272 may represent or embody nominally the same first set of pixels as first light signals 271 corresponding to the same first image or the same first portion of an image. Second light signals 272 are redirected by optical splitter 250 towards holographic combiner 230 along optical paths that trace back to effectively originate from second virtual position 262 for SLP 220. Holographic combiner 230 receives second light signals 272 and converges second light signals 272 to second exit pupil 282 at eye 290. Because first light signals 271 and second light signals 272 represent or embody nominally the same display content, first exit pupil 281 and second exit pupil 282 each provides a respective instance (e.g., a respective replicated or repeated instance) of the same display content to a different respective position at or proximate eye 290. In this way, eye 290 is able to see the same content regardless of which at least one of first exit pupil 281 and/or second exit pupil 282 aligns with the gaze direction (e.g., pupil position) of eye 290. Rather than comprising a single exit pupil at one location, eyebox 280 of WHUD 200 is expanded to comprise spatially-separated first and second exit pupils 281 and 282.

Over third sub-range $\varphi_3$ of total scan range $\theta$, SLP 220 may generate third light signals 273 and third light signals 273 may represent or embody nominally the same first set of pixels as first light signals 271 and second light signals 272 corresponding to the same first image or the same first portion of an image. Third light signals 273 are redirected by optical splitter 250 towards holographic combiner 230 along optical paths that trace back to effectively originate from third virtual position 263 for SLP 220. Holographic combiner 230 receives third light signals 273 and converges third light signals 273 to third exit pupil 283 at eye 290. Because third light signals 273 represent or embody nominally the same display content as first light signals 271 and second light signals 272, third exit pupil 283 provides another instance (e.g., another replicated or repeated instance) of the same display content as that provided by first exit pupil 281 and second exit pupil 282 to another position at or proximate eye 290. In this way, eye 290 is able to see the same content regardless of which at least one of first exit pupil 281, second exit pupil 282, and/or third exit pupil 283 aligns with the gaze direction (e.g., pupil position) of eye 290. Eyebox 280 of WHUD 200 is expanded to comprise spatially-separated first, second, and third exit pupils 281, 282, and 283. As previously described, expansion of eyebox 280 to include three exit pupils 281, 282, and 283 in WHUD 200 is used for illustrative purposes only. The present systems, devices, and methods may be extended to expand the eyebox of a WHUD to include any number N of exit pupils depending on the requirements of the specific application.

Throughout this specification, the expression "nominally the same" is generally used in reference to certain light signals (e.g., first light signals 271 being nominally the same as second light signals 272) to indicate that those particular light signals are defined to represent the same content when viewed by the user. For example, first light signals 271 and second light signals 272 are "nominally the same" when first light signals 271 and second light signals 272 are both defined by SLP 220 to represent the same image, or the same portion of an image, or generally the same display content. The term "nominally" in "nominally the same" is meant to reflect the fact that, in some situations, even though two light signals (e.g., two sets of light signals, as with first light signals 271 and second light signals 272) may both be defined to represent the same display content the two light signals (or sets of light signals) may not be identical sets of light signals. Such a situation can arise, for example, when the two light signals (e.g., the two sets of light signals) are each exposed to different respective optical distortions.

In the various implementations described herein, multiple (i.e., N) instances of an image are effectively projected from respective ones of multiple (i.e., N) different virtual positions. Each one of the N virtual positions corresponds to a respective range of optical paths through the optical splitter and effectively "projects" light signals towards or on the holographic combiner over a respective range of optical paths comprising a respective range of directions and/or angles. As a consequence, each one of the N virtual positions may effectively "project" light signals with a different respective optical distortion profile. For example, a first set of light signals (e.g., representing a first instance of an image) effectively originating from a first virtual position may be subject to a first set of optical distortions (e.g., image skewing, keystoning, aberrations, and so on) resulting from the particular set of optical paths the first set of light signals follows through the optical splitter, from the optical splitter to the holographic combiner, and/or from the holographic combiner to the first exit pupil. Likewise, a second set of light signals (e.g., representing a second instance of the same image) effectively originating from a second virtual position may be subject to a second set of optical distortions (e.g., image skewing, keystoning, aberrations, and so on) resulting from the particular set of optical paths the second set of light signals follows through the optical splitter, from the optical splitter to the holographic combiner, and/or from the holographic combiner to the second exit pupil. The first set of optical distortions and the second set of optical distortions may not be identical. In order to correct for optical distortions, the SLP may be calibrated to apply various offsets, compensations, corrections, or other measures to projected light signals so that the light signals account for the optical distortions and will appear correctly at the eye of the user. Since the first set of optical distortions and the second set of optical distortions may not be identical to one another, the SLP may be calibrated to apply a first image correction profile (e.g., a first set of image correction measures) to the first set of light signals (e.g., representing the first instance of the image) and a second image correction profile (e.g., a second set of image correction measures) to the second set of light signals (e.g., representing the second instance of the same image). Therefore, even though the first set of light signals and the second set of light signals may each be defined by the SLP to represent the same display content, the first set of light signals and the second set of light signals may not be identical to one another. In this example, the first set of light signals and the second set of light signals are not the same but they are said to be "nominally the same" because they are each defined by the SLP to represent the same display content.

Returning to FIG. 2A, FIG. 2A depicts the cumulative effect of a sweep through successive ranges of the first sub-range $\varphi_1$ from FIG. 2B, the second sub-range $\varphi_2$ from FIG. 2C, and the third sub-range $\varphi_3$ from FIG. 2D to produce three exit pupils 281, 282, and 283, respectively, at eye 290 during a sweep of the total scan range $\theta$ by SLP 220 in accordance with the present systems, devices, and method. In other words, FIG. 2A simultaneously depicts each one of the three ranges of time shown in FIGS. 2B, 2C, and 2D all overlaid into one illustration. Eyebox 280 comprises three exit pupils 281, 282, and 283 and each of the three exit pupils 281, 282, and 283 provides a respective temporally-separated copy or instance of the same display content to eye 290 over a different range of time. For example, first exit pupil 281 may provide a first instance of a first image to eye 290 over the range of time during which SLP 220 sweeps through first sub-range $\varphi_1$ (e.g., over the range of time during which SLP 220 sweeps through the first ⅓ of the total scan range $\theta$), second exit pupil 282 may provide a second instance of the first image to eye 290 over the range of time during which SLP 220 sweeps through second sub-range $\varphi_2$ (e.g., over the range of time during which SLP 220 sweeps through the second ⅓ of the total scan range $\theta$), and third exit pupil 283 may provide a third instance of the first image to eye 290 over the range of time during which SLP 220 sweeps through third sub-range $\varphi_3$ (e.g., over the range of time during which SLP 220 sweeps through the third ⅓ of the total scan range $\theta$). Thus, the three instances of the first image provided by respective ones of the three exit pupils 281, 282, and 283 may be projected temporally in series (i.e., serially) with one another. In order that the user does not see three sequential projections of the same display content, SLP 220 may re-modulate the three respective instances of the same display content at a rate that is too fast to be discerned by eye 290. The cumulative effect (i.e., the concurrence of exit pupils 281, 282, and 283) depicted in FIG. 2A may represent what is actually perceived by the user when, as depicted sequentially in FIGS. 2B, 2C, and 2D, SLP 220 quickly (e.g., at about 60 Hz) remodulates N sequential instances of the same display content over a sweep of the total scan range $\theta$ and optical splitter 250 splits the sweep of the total scan range $\theta$ into respective ones of N sub-ranges $\varphi_i$ with each sub-range $\varphi_i$ corresponding to a respective one of the N sequential instances of the display content.

In accordance with the present systems, devices, and methods, SLP 220 and optical splitter 250 together separate or "split" the light signals 270 projected by SLP 220 over the total scan range $\theta$ into N=3 sub-ranges $\varphi_1$, $\varphi_2$, and $\varphi_3$ to produce N=3 instances 271, 272, and 273 of the same display content. Because each of these N=3 instances follows a different respective range of optical paths effectively originating from a different respective spatially-separated virtual position 261, 262, and 263 for SLP 220, holographic combiner 230 converges each of these N=3 instances to a respective spatially-separated exit pupil 281, 282, and 283 at or proximate eye 290. Spatially-separated exit pupils 281, 282, and 283 are distributed over an area of eye 290 that covers a wider range of pupil positions (e.g., gaze directions) than a single exit pupil (of the same size as any one of exit pupils 281, 282, and 283) on its own. Thus, eyebox 280 is expanded by exit pupil replication in WHUD 200.

In the illustrated example, each of the N=3 virtual positions 261, 262, and 263 for SLP 220 effectively created or established by optical splitter 250 is different (i.e., spatially-separated) from real position 260. However, in some implementations optical splitter 250 may include a configuration or arrangement of one or more optical element(s) or optical device(s) for which a sub-range $\varphi_i$ of light signals 270 is directed to holographic combiner 230 effectively from real position 260 rather than from a virtual position.

In FIG. 2A, light signals 271 effectively originating from first virtual position 261, light signals 272 effectively originating from second virtual position 262, and light signals 273 effectively originating from third virtual position 263, are all shown incident at or on about the same region of holographic combiner 230. This configuration is exemplary and in practice alternative configurations may be preferred depending on the specific implementation. Generally, each sub-range $\varphi_i$ of light signals (e.g., each of light signals 271, light signals 272, and light signals 273) may be incident upon (and received by) a respective region or area of holographic combiner 230 and these respective areas of holographic combiner 230 may or may not completely overlap (e.g., such areas may partially overlap or correspond to separate, non-overlapping areas).

In a virtual retina display such as scanning laser-based WHUD 100 and/or scanning laser-based WHUD 200, there may not be an "image" formed outside of the eye of the user. There is typically no microdisplay or projection screen or other place where the projected image is visible to a third party; rather, the image may be formed completely within the eye of the user. For this reason, it may be advantageous for a scanning laser-based WHUD to be designed to accommodate the manner in which the eye forms an image.

For a light signal entering the eye (e.g., a light ray, a wavefront, an incident beam from a SLP, or similar), the eye (or more accurately, the combination of the eye and the human brain) may determine "where" the light signal is positioned in the user's field of view based on the region of the retina that is illuminated by the light signal. Two light signals that illuminate the same region of the retina may appear in the same position in the user's field of view. The particular region of the retina that is illuminated by any given light signal is determined by the angle and not the location at which the light signal enters the eye. Thus, two light signals may appear in the same position in the user's field of view even if they enter different location of the user's pupil provided that the two light signals have the same angle of incidence when they enter the user's eye. The geometry of the eye's lens is such that any two light signals entering the eye at the same angle, regardless of the position/location at which the light signals enter the eye, may generally be directed to the same region of the retina and so may generally appear in the same position in the user's field of view.

In at least some implementations, the scanning laser-based WHUDs described herein project multiple instances of the same image onto the retina of the eye in rapid succession. Even if the multiple instances are temporally-separated, the temporal separation may be small enough to be undetectable by the user. If any two of the multiple instances of the same image do not align/overlap on the eye's retina then those two instances of the image may not align/overlap in the user's field of view and undesirable effects such as ghosting can occur. In order to ensure that multiple instances of the same image (each corresponding to a respective exit pupil) align/overlap on the retina so that multiple instances of the image align/overlap in the user's field of view, a scanning laser-based WHUD may advantageously be configured to direct multiple instances of any given light signal (each corresponding to a respective exit pupil and each representing a respective instance of the same display content) towards the eye spatially in parallel with one another. More specifically and referring to FIG. 2A, the optical splitter 250 and/or the holographic combiner 230 may be configured, arranged and/or operated (either individually or in combination) so that the holographic combiner 230 redirects the N=3 sets of light signals 271, 272, and 273, respectively, all spatially in parallel with one another towards respective regions (i.e., towards respective ones of N=3 spatially-separated exit pupils 281, 282, and 283) of the eye 290 of the user.

Figure 2E:
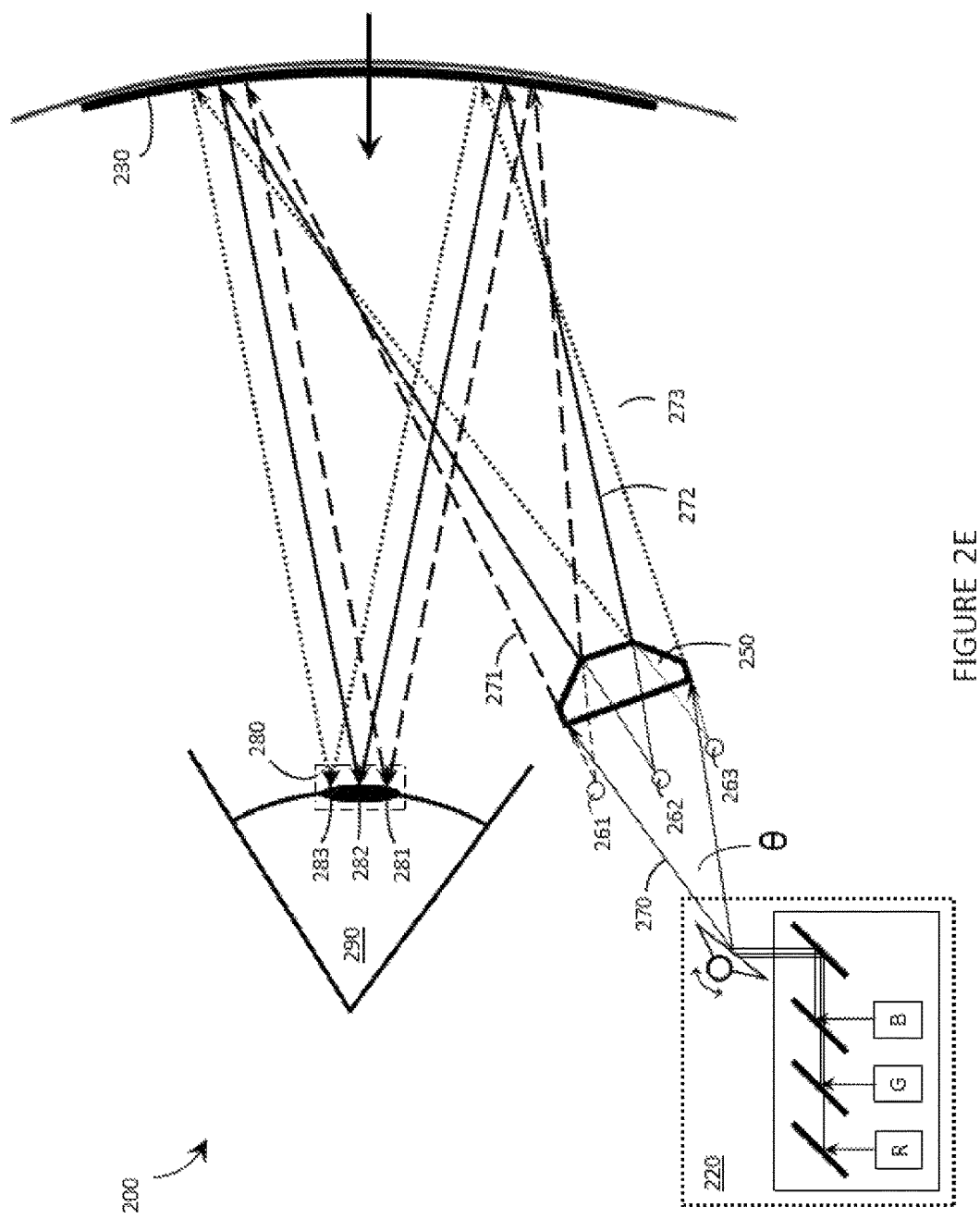
FIG. 2E is an illustrative diagram of the wearable heads-up display from FIGS. 2A, 2B, 2C, and 2D showing eyebox expansion by temporally sequential exit pupil replication with respective instances of the same display content projected spatially in parallel with one another towards respective exit pupils in accordance with the present systems, devices, and methods.

FIG. 2E is an illustrative diagram of WHUD 200 from FIGS. 2A, 2B, 2C, and 2D showing eyebox expansion by temporally sequential exit pupil replication with respective instances of the same display content (e.g., pixel(s)) projected spatially in parallel with one another towards respective exit pupils in accordance with the present systems, devices, and methods. In order to highlight some of the features shown in the implementation of FIG. 2E, the corresponding aspects of FIG. 2A will first be noted.

In the implementation of FIG. 2A, light signals 271 effectively originating from first virtual position 261, light signals 272 effectively originating from second virtual position 262, and light signals 273 effectively originating from third virtual position 263, all align with one another and completely overlap on holographic combiner 230. As a result, each of the N=3 exit pupils 281, 282, and 283 converges at or proximate eye 290 from substantially the same area of holographic combiner 230. Because each of the N=3 exit pupils 281, 282, and 283 originates from substantially the same area of holographic combiner 230 but converges to a respective spatially-separated region of eye 290, each of the N=3 exit pupils 281, 282, and 283 necessarily includes at least some light signals having incident angles (at eye 290), or reflection angles (at holographic combiner 230), that cannot be provided by at least one other one of the N=3 exit pupils 281, 282, and 283. For example, light signals 271 (represented by lines with large dashes) that converge to exit pupil 281 include at least some angles of incidence (at eye 290, or angles of reflection at holographic combiner 230) that are not included in light signals 272 (represented by solid lines) that converge to exit pupil 282, and vice versa. As previously described, the angle of incidence of a light signal as it enters the eye determines where in the user's field of view the light (or the pixel of an image embodied by the light signal) will appear. A light signal having an angle of incidence that is unique to one exit pupil can only be projected to a user when that exit pupil aligns with the user's pupil (e.g., when the user's gaze direction includes that exit pupil). Thus, when multiple spatially-separated exit pupils all originate from substantially the same spatial area on holographic combiner 230, only a limited sub-region of that spatial area may be used to provide angles of incidence that are common to all of the exit pupils and, consequently, only a respective limited fraction of the available field of view and/or resolution of each spatially-separated exit pupil may be used to provide uniform image replication across all of the exit pupils. Having light signals 271 effectively originating from first virtual position 261, light signals 272 effectively originating from second virtual position 262, and light signals 273 effectively originating from third virtual position 263, all align and overlap on holographic combiner 230 can simplify some aspects of the design of optical splitter 250 and/or holographic combiner 230 but can also limit the available resolution and/or field of view of display content that can be replicated across all exit pupils.

In the implementation of FIG. 2E, optical splitter 250 is modified (e.g., in geometry, orientation, and/or composition) to shift the relative trajectories of light signals 271, 272, and 273 compared to their corresponding trajectories in the implementation of FIG. 2A. Light signals 271 effectively originating from first virtual position 261, light signals 272 effectively originating from second virtual position 262, and light signals 273 effectively originating from third virtual position 263, do not align or completely overlap on holographic combiner 230 in FIG. 2E as they do in FIG. 2A. Instead, light signals 271, light signals 272, and light signals 273 are spatially distributed over the area of holographic combiner 230 and each positioned (at incidence on holographic combiner 230) so that they are all substantially spatially parallel to one another when redirected (e.g., reflected) and converged by holographic combiner 230 towards respective ones of the N=3 spatially-separated exit pupils 281, 282, and 283 at or proximate eye 290. That is, light signals 271 that are converged by holographic combiner 230 to exit pupil 281, light signals 272 that are converged by holographic combiner 230 to exit pupil 282, and light signals 273 that are converged by holographic combiner 230 to exit pupil 283, all include the same angles of reflection from holographic combiner 230 and accordingly the same angles of incidence with respect to eye 290. In contrast to the implementation of FIG. 2A, in the implementation of FIG. 2E none of the N=3 exit pupils 281, 282, and 283 includes a light signal having an angle of incidence (with respect to eye 290, or an angle of reflection with respect to holographic combiner 230) that is not also included in each of the other ones of the N=3 exit pupils 281, 282, and 283. Each of the N=3 exit pupils 281, 282, and 283 of the implementation in FIG. 2E includes the entire field of view and/or resolution available thereto and therefore the implementation of WHUD 200 depicted in FIG. 2E can provide uniform image replication across multiple exit pupils (e.g., multiple temporally-separated and spatially-separated exit pupils) with larger field of view and/or with higher resolution than the implementation of WHUD 200 depicted in FIG. 2A, at the cost of added complexity in optical splitter 250 and/or holographic combiner 230.

As previously described, holographic combiner 230 comprises at least one hologram embedded in, encoded in, recorded in, or otherwise carried by at least one layer of holographic film. The holographic film may include, as examples, a photopolymer film such as Bayfol®HX from Bayer MaterialScience AG or a silver halide compound. The nature of the at least one hologram may depend on the specific implementation.

As a first example, holographic combiner 230 may include a single hologram that effectively operates as a fast-converging (e.g., convergence within about 1 cm, convergence within about 2 cm, or convergence within about 3 cm) mirror for light having the wavelength(s) provided by SLP 220. In this first example, the holographic film that carries the first hologram may have a relatively wide bandwidth, meaning the hologram recorded in the holographic film may impart substantially the same optical effect or function on all light signals 270 projected by SLP 220 over a relatively wide range of angles of incidence at holographic combiner 230. For the purpose of the present systems, devices, and methods, the term "wide bandwidth" in relation to holograms and holographic films means an angular bandwidth that is greater than or equal to the total range of angles of incidence of all light signals received by any given point, region, or location of the hologram or holographic film from an optical splitter. As an example, WHUD 200 may implement a wide bandwidth hologram in holographic combiner 230 having an angular bandwidth of greater than or equal to about 8°. In this case, the spatial separation between virtual positions 261, 262, and 263 may be such that any given point, region, or location of holographic combiner 230 receives light signals (i.e., included in any of light signals 271, 272, and 273) spanning an 8° (or less) range of angles of incidence at holographic combiner 230.

Consistent with conventional mirror behavior, for a single wide-bandwidth fast-converging hologram carried by holographic combiner 230 the angles of incidence for a range of light signals incident on holographic combiner 230 may influence the angles of reflection for that range of light signals redirected by holographic combiner 230. Since holographic combiner 230 is, generally during normal operation of WHUD 200, fixed in place relative to SLP 220, the angles of incidence for a range of light signals are determined, at least in part, by the particular virtual position 261, 262, or 263 for the SLP 220 from which optical splitter 250 causes the range of light signals to effectively originate. The spatial position of the exit pupil 281, 282, or 283 to which the range of light signals is converged by holographic combiner 230 is then determined, at least in part, by the angles of reflection of that range of light signals from holographic combiner 230. Each one of virtual positions 261, 262, and 263 provides light signals over a respective range of angles of incidence (generally but not necessarily with at least some overlap) at holographic combiner 230 and therefore holographic combiner 230 converges light signals from each one of virtual positions 261, 262, and 263 to a respective one of exit pupils 281, 282, and 283. This is why, referring to FIG. 2A for example, light signals 271 that effectively originate from virtual position 261 (represented by lines with large dashes) with a range of relatively small angles of incidence (compared to light signals 272 and 273 that effectively originate from virtual positions 262 and 263, respectively) map to exit pupil 281 with a range of relatively small angles of reflection (compared to the other exit pupils 282 and 283) and light signals 273 that effectively originate from virtual position 263 (represented by dotted lines) with a range of relatively large angles of incidence (compared to light signals 271 and 272 that effectively originate from virtual positions 261 and 262, respectively) map to exit pupil 283 with a range of relatively large angles of reflection (compared to the other exit pupils 281 and 282).

As a second example, rather than a single hologram, holographic combiner 230 may instead include any number of multiplexed holograms. Multiplexed holograms may be advantageous when, for example, multiple wavelengths of light signals are used (e.g., red, green, and blue light signals generated by SLP 220) and/or to provide a further means to separate light signals effectively originating from different virtual positions for SLP 220. The "single hologram" example described above may be suitable for an implementation in which SLP 220 only provides light signals of a single wavelength (e.g., only red light signals, only green light signals, or only blue light signals), but for implementations in which SLP 220 provides light signals of multiple wavelengths it may be advantageous for holographic combiner 230 to include a respective wavelength multiplexed hologram for each respective wavelength of light signals provided by SLP 220 (e.g., each respective nominal wavelength of light signals provided by SLP 220, since a laser diode may generally provide light signals over a narrow waveband). Thus, when SLP 220 includes three different laser diodes each providing light signals of a respective nominal wavelength (e.g., a red laser diode, a green laser diode, and a blue laser diode) it may be advantageous for holographic combiner 230 to include three wavelength-multiplexed holograms (e.g., a red hologram, a green hologram, and a blue hologram) each designed to work (e.g., "playback") for light signals having a respective one of the three nominal wavelengths. In this example, at least one "red hologram" (i.e., at least one hologram that is designed to playback for light signals having a wavelength that corresponds to red light) may converge a respective red component of each of light signals 271, 272, and 273 to a respective one of the N=3 exit pupils 281, 282, and 283, at least one "green hologram" (i.e., at least one hologram that is designed to playback for light signals having a wavelength that corresponds to green light) may converge a respective green component of each of light signals 271, 272, and 273 to a respective one of the N=3 exit pupils 281, 282, and 283, and at least one blue hologram (i.e., at least one hologram that is designed to playback for light signals having a wavelength that corresponds to blue light) may converge a respective blue component of each of light signals 271, 272, and 273 to a respective one of the N=3 exit pupils 281, 282, and 283. In other words, for a light signal redirected from a particular one of the N spatially-separated virtual positions for the SLP by the optical splitter, the at least one red hologram may converge a red component of the light signal to a particular one of the N exit pupils at or proximate the eye of the user, the at least one green hologram may converge a green component of the light signal to the particular one of the N exit pupils at or proximate the eye of the user, and the at least one blue hologram may converge a blue component of the light signal to the particular one of the N exit pupils at or proximate the eye of the user.

As a third example, either apart from or in addition to multiple wavelength-multiplexed holograms, holographic combiner 230 may include at least N angle-multiplexed holograms. That is, for an implementation with N=3 virtual positions 261, 262 and 263 for the SLP 220 and N=3 exit pupils 281, 282, and 283, holographic combiner 230 may include at least N=3 angle-multiplexed holograms (or N=3 sets of angle-multiplexed holograms when wavelength multiplexing is also employed, as discussed later on). Each of the N=3 angle-multiplexed holograms may be designed to playback for light signals effectively originating from a respective one of the N=3 virtual positions 261, 262, and 263 for SLP 220 and converge such light signals to a respective one of the N=3 exit pupils 281, 282, and 283. That is, a first angle-multiplexed hologram may be designed to playback for light signals 271 effectively originating from virtual position 261 for SLP 220 and converge light signals 271 to first exit pupil 281, a second angle-multiplexed hologram may be designed to playback for light signals 272 effectively originating from virtual position 262 for SLP 220 and converge light signals 272 to second exit pupil 282, and a third angle-multiplexed hologram may be designed to playback for light signals 273 effectively originating from virtual position 263 for SLP 220 and converge light signals 273 to third exit pupil 283.

For implementations that employ angle-multiplexing, it may be advantageous for the holographic film that includes an angle-multiplexed hologram to be of relatively narrow bandwidth. Particularly, it may be advantageous for the holographic film to have an angular bandwidth that is less than or about equal to the minimum difference between the respective angles of incidence of two light signals that are incident on the same point, region, or location of holographic combiner 230 but effectively originate from different virtual positions 261, 262, and 263. As an example, WHUD 200 may implement a narrow bandwidth angle-multiplexed hologram in holographic combiner 230 having an angular bandwidth of less than or equal to about 4°. In this case, the difference between the angle of incidence (at holographic combiner 230) of a light signal 271 that effectively originates from virtual position 261 and is incident at a first point on holographic combiner 230 and the angle of incidence (at holographic combiner 230) of a light signal 272 that effectively originates from virtual position 262 and is incident at the same first point on holographic combiner 230 may be less than or equal to about 4°. In this way, each respective angle-multiplexed hologram in holographic combiner 230 may be designed to substantially exclusively playback for a respective one of light signals 271, 272, or 273 effectively originating from a respective one of virtual positions 261, 262, or 263 for SLP 220 and to substantially not playback (e.g., insubstantially playback) for the other ones of light signals 271, 272, or 273 effectively originating from the other ones of virtual positions 261, 262, or 263 for SLP 220.

Generally, holographic combiner 230 may include at least N multiplexed holograms and each one of the at least N multiplexed holograms may converge light signals corresponding to a respective one of the N spatially-separated virtual positions for SLP 220 to a respective one of N exit pupils at or proximate the eye 290 of the user.

Some implementations may employ both wavelength multiplexing and angle multiplexing. For example, an implementation that employs angle multiplexing and light signals of multiple wavelengths (e.g., a multi-color SLP) may advantageously also employ wavelength multiplexing. In this case, holographic combiner 230 may include a wavelength-multiplexed and angle-multiplexed holographic combiner that includes at least N angle-multiplexed red holograms, at least N angle-multiplexed green holograms, and at least N angle-multiplexed blue holograms. Each one of the at least N angle-multiplexed red holograms may converge red components of light signals (e.g., 271) redirected from a respective one of the N spatially-separated virtual positions (e.g., 261) for SLP 220 by optical splitter 250 to a respective one of the N exit pupils (e.g., 281) at or proximate eye 290. Each one of the at least N angle-multiplexed green holograms may converge green components of light signals (e.g., 271) redirected from a respective one of the N spatially-separated virtual positions (e.g., 261) for SLP 220 by optical splitter 250 to a respective one of the N exit pupils (e.g., 281) at or proximate eye 290. Each one of the at least N angle-multiplexed blue holograms may converge blue components of light signals (e.g., 271) redirected from a respective one of the N spatially-separated virtual positions (e.g., 261) for SLP 220 by optical splitter 250 to a respective one of the N exit pupils (e.g., 281) at or proximate eye 290.

Implementations of holographic combiner 230 that employ multiple multiplexed holograms may include multiple holograms in or on a single layer (i.e., all in or on the same layer) of holographic film or may include multiple layers of holographic film with each layer of holographic film carrying at least one respective hologram. Holographic combiner 230 may or may not comprise at least one volumetric holographic optical element. Generally, holographic combiner 230 may comprise a single layer of holographic film that carries any number of holograms or holographic combiner 230 may comprise multiple layers of holographic film (e.g., multiple layers laminated together) with each respective layer of holographic film carrying any number of respective holograms.

Holographic combiner 230 may be substantially flat or planar in geometry or, as illustrated in FIGS. 2A, 2B, 2C, 2D, and 2E, holographic combiner 230 may embody some curvature. In some implementations, holographic combiner 230 may embody curvature because holographic combiner 230 is carried by a prescription eyeglass lens 240 that has some curvature. When necessary, holographic combiner 230 may include systems, devices, and/or methods for curved holographic optical elements described in U.S. Provisional Patent Application Ser. No. 62/268,892.

The various embodiments described herein provide systems, devices, and methods for eyebox expansion by exit pupil replication in scanning laser-based WHUDs. Each replicated exit pupil is aligned to a respective spatially-separated position at or proximate the eye of the user because the optical splitter selectively routes the light signals along spatially-separated optical paths that each trace back to (e.g., each appear to effectively originate from) a different spatially-separated virtual position for the SLP. The effect is substantially the same as if multiple SLPs were used instead of the optical splitter, with each SLP positioned in a respective one of the virtual positions and with each SLP projecting a respective instance of a light signal towards the holographic combiner; however, the use of the optical splitter has considerable advantages in terms of power savings and minimizing hardware bulk.

Optical splitter 250 separates or splits light signals 270 into light signals 271, 272, and 273 and redirects light signals 271, 272, and 273 ultimately towards respective ones of exit pupils 281, 282, and 283 at eye 290. SLP 220 may be modulated to repeat nominally the same display content for each of light signals 271, 272, and 273. This redundancy enables WHUD 200 to rapidly display N=3 instances of the same image at N=3 different regions of eye 290 and thereby expand the eyebox 280 of the system to encompass all N=3 exit pupils 281, 282, and 283. However, in some applications or implementations, only one instance of an image may need to be (or want to be) displayed to eye 290 at any given time. Such can simplify the operation of SLP 220 and save the power required to produce multiple potentially redundant instances of the same image. In accordance with the present systems, devices, and methods, a WHUD 200 may include an eye tracker communicatively coupled to SLP 220 (either directly or by common communicative coupling to another element, such as a processor or non-transitory processor-readable storage medium) to determine the pupil position (e.g., gaze direction) of eye 290. Information about the pupil position (or gaze direction) of eye 290 may be used by SLP 220 to determine over which one(s) of the N sub-ranges $\varphi_i$ of the total scan range $\theta$ to modulate light signals in order to provide display content to the user. That is, based on information about the pupil position (or gaze direction) of eye 290, SLP 220 may optionally only generate light signals over the particular sub-range(s) $\varphi_i$ of the total scan range $\theta$ that correspond to the particular exit pupil(s) that align(s) with the current pupil position (or gaze direction) of eye 290. If the gaze direction of eye 290 (as determined by an eye tracker of WHUD 200) is such that the pupil of eye 290 only aligns with one exit pupil (e.g., with exit pupil 283), then SLP 220 may be modulated to only generate light signals during the $\varphi_3$ sub-range portion of the total scan range $\theta$ so that only light signals 273 are produced and the power associated with generating redundant light signals 271 and 272 may be saved.

An eye tracker included in any of the implementations of WHUDs described herein may employ any of a variety of different eye tracking technologies depending on the specific implementation. For example, an eye tracker may employ any or all of the systems, devices, and methods described in U.S. Provisional Patent Application Ser. No. 62/167,767; U.S. Provisional Patent Application Ser. No. 62/271,135; U.S. Provisional Patent Application Ser. No. 62/245,792; and/or U.S. Provisional Patent Application Ser. No. 62/281,041. As previously described, WHUD 200 may include at least one processor and at least one non-transitory processor-readable storage medium or memory communicatively coupled thereto. The at least one memory may store processor-executable data and/or instructions that, when executed by the at least one processor, cause the at least one processor to control the operation of either or both of SLP 220 and/or an eye tracker.

As described previously, optical splitter 250 includes at least one optical element that is arranged to receive light signals 270 corresponding to a sweep of the total two-dimensional scan range $\theta$ by SLP 220, separate the light signals into N two-dimensional sub-ranges $\varphi_i$ based on the point of incidence of each light signal 270 at optical splitter 250, where $$\sum_{i=1}^{N} \varphi_i = \theta,$$

and redirect the light signals in each two-dimensional sub-range $\varphi_i$ towards holographic combiner 230 effectively from a respective one of N spatially-separated virtual positions 261, 262, and 263 for SLP 220. As also described previously, the total two-dimensional scan range $\theta$ of a SLP may be broken down into a total scan range $\Omega$ in a first dimension corresponding to all available directions and/or angles of light signals in a first dimension (e.g., the horizontal dimension) that the SLP is operative to output during normal use, and a total scan range $\psi$ in a second dimension corresponding to all available directions and/or angles of light signals in a second dimension (e.g., the vertical dimension) that the SLP is operative to output during normal use. When the total two-dimensional scan range $\theta$ of SLP 220 includes a total scan range $\Omega$ in a first dimension, then at least one optical element of optical splitter 250 may be arranged to receive light signals corresponding to a sweep of the total scan range $\Omega$ in the first dimension by SLP 220, separate the light signals corresponding to the sweep of the total scan range $\Omega$ in the first dimension into X sub-ranges $\omega_i$ in the first dimension based on point of incidence at optical splitter 250, where 1<X≤N and $$\sum_{i=1}^{X} \omega_i = \Omega,$$

and redirect the light signals corresponding to the sweep of the total scan range $\Omega$ in the first dimension towards holographic combiner 230 effectively from at least X of the N spatially-separated virtual positions for SLP 220. In this case, each one of the X sub-ranges $\omega_i$ may correspond to a different one of the N spatially-separated virtual positions for SLP 220. The particular virtual position for SLP 220 from which each light signal in the sweep of the total scan range $\Omega$ in the first dimension is redirected by optical splitter 250 may depend on (e.g., may be determined by) the particular sub-range $\omega_i$ in the first dimension to which the light signal corresponds. When holographic combiner 230 receives light signals corresponding to the sweep of the total scan range $\Omega$ in the first dimension, at least one hologram of holographic combiner 230 may converge the light signals to respective ones of at least X of the N exit pupils at or proximate eye 290. The particular exit pupil towards which a light signal in the sweep of the total scan range $\Omega$ in the first dimension is redirected by holographic combiner 230 may depend on (e.g., may be determined by) at least the particular sub-range $\omega_i$ in the first dimension into which the light signal is separated by optical splitter 250.

When the total two-dimensional scan range θ of SLP 220 further includes a total scan range ψ in a second dimension, with for example θ=Ω×ψ, then at least one optical element of optical splitter 250 may be arranged to receive light signals corresponding to a sweep of the total scan range ψ in the second dimension by SLP 220, separate the light signals corresponding to the sweep of the total scan range ψ in the second dimension into Y sub-ranges $\beta_i$ in the second dimension based on point of incidence at optical splitter 250, where 1<Y≤N and $$\sum_{i=1}^{Y} \beta_i = \Psi,$$

and redirect the light signals corresponding to the sweep of the total scan range ψ in the second dimension towards holographic combiner 230 effectively from at least Y of the N spatially-separated virtual positions for SLP 220. In this case, each one of the Y sub-ranges $\beta_i$ may correspond to a different one of the N spatially-separated virtual positions for SLP 220. For at least one virtual position for SLP 220, at least one of the X sub-ranges $\omega_i$ in the first dimension and at least one of the Y sub-ranges $\beta_i$ in the second dimension may both correspond to the same virtual position for SLP 220. The particular virtual position for SLP 220 from which each light signal in the sweep of the total scan range ψ in the second dimension is redirected by optical splitter 250 may depend on (e.g., may be determined by) the particular sub-range $\beta_i$ in the second dimension to which the light signal corresponds.

When holographic combiner 230 receives light signals corresponding to both a sweep of the total scan range Ω in the first dimension and a sweep of the total scan range ψ in the second dimension, at least one hologram of holographic combiner 230 may converge the light signals to the N exit pupils at or proximate eye 290. In this case, the particular exit pupil towards which a light signal is converged by holographic combiner 230 may depend on (e.g., may be determined by) both the particular sub-range $\omega_i$ in the first dimension and the particular sub-range $\beta_i$ in the second dimension into which the light signal is separated by optical splitter 250.

The illustrative examples of the present systems, devices, and methods depicted in FIGS. 2A, 2B, 2C, 2D, and 2E are all generally shown in two-dimensions and generally illustrate eyebox configurations in which multiple exit pupils are spatially separated in one dimension across the eye of the user. In practice, the expanded eyebox configurations described herein may comprise any number N of replicated or repeated exit pupils arranged in any two-dimensional configuration over the area of the eye of the user. An example configuration with N=4 replicated/repeated exit pupils is provided in FIG. 3.

FIG. 3 is an illustrative diagram showing an exemplary holographic combiner 330 in two-dimensions converging four instances of replicated (e.g., repeated) light signals to form an expanded eyebox 380 comprising four spatially-separated exit pupils 381, 382, 383, and 384 at or proximate the eye 390 of a user in accordance with the present systems, devices, and methods. Exit pupils 381, 382, 383, and 384 are distributed over a two-dimensional area at or near eye 390 to cover a wide range of pupil positions (e.g., gaze directions) for eye 390. As long as the pupil of eye 390 is positioned within eyebox 380, at least one of exit pupils 381, 382, 383, and 384 (in some cases a combination of at least two of exit pupils 381, 382, 383, and 384) will provide light signals through the pupil to eye 390 and the user will be able to see the projected image. In terms of optical path, each one of exit pupils 381, 382, 383, and 384 may receive light signals corresponding to a respective sub-range $\varphi_i$ of the total scan range θ of an SLP.

Exemplary optical splitter 250 in FIGS. 2A, 2B, 2C, 2D, and 2E is a faceted, prismatic structure. Such a structure is shown for illustrative purposes only and not intended to limit the composition of the optical splitters described herein to faceted, prismatic structures or structures of similar geometry. While faceted, prismatic structures may be suitable as optical splitters in certain implementations, as previously described the optical splitters described herein may comprise any of a variety of different components depending on the specific implementation. Two non-limiting examples of different constructions and operations of optical splitters as described herein are provided in FIG. 4 and FIG. 5.

FIG. 4 is a schematic diagram of an example of an optical splitter 400 for separating the total scan range θ of a SLP 420 into three sub-ranges $\varphi_1$, $\varphi_2$, and $\varphi_3$ in accordance with the present systems, devices, and methods. Optical splitter 400 includes a first optical structure 450 having two reflective surfaces 401 and 402 and two transmissive surfaces 411 and 412. Reflective surfaces 401 and 402 are oriented at two different angles. SLP 420 (which may be substantially similar to SLP 120 from FIG. 1 and SLP 220 from FIGS. 2A, 2B, 2C, 2D, and 2E) has a total scan range θ that includes sub-ranges $\varphi_1$, $\varphi_2$, and $\varphi_3$ as indicated in FIG. 4, with $$\sum_{i=1}^{3} \varphi_i = \theta.$$

SLP 420 may be operated to scan three sequential copies or instances of nominally the same image: a first instance in sub-range $\varphi_1$, a second instance in sub-range $\varphi_2$, and a third instance in sub-range $\varphi_3$. The first instance of the image projected over sub-range $\varphi_1$ is reflected by first reflective surface 401 of optical structure 450 and then reflected again by a third reflector (e.g., mirror) 403. Third reflector 403 is oriented to redirect light signals 471 (analogous to light signals 271 from FIGS. 2A, 2B, and 2E) corresponding to sub-range $\varphi_1$ towards, for example, a projection screen or the holographic combiner of a WHUD (not shown in FIG. 4 to reduce clutter). The second instance of the image projected over sub-range $\varphi_2$ is transmitted through first and second transmissive surfaces 411 and 412 of optical structure 450 as light signals 472 (analogous to light signals 272 from FIGS. 2A, 2C, and 2E) corresponding to sub-range $\varphi_2$ towards, for example, a projection screen or the holographic combiner of a WHUD. The third instance of the image projected over sub-range $\varphi_3$ is reflected by second reflective surface 402 of optical structure 450 and then reflected again by a fourth reflector (e.g., mirror) 404. Fourth reflector 404 is oriented to redirect light signals 473 (analogous to light signals 273 from FIGS. 2A, 2D, and 2E) corresponding to sub-range $\varphi_3$ towards, for example, a projection screen or the holographic combiner of a WHUD. In this way, three nominally-identical instances of an image may be produced (e.g., sequentially generated) by SLP 420 and directed towards a holographic combiner (e.g., 230) effectively from three different positions (one real position, two virtual positions) for SLP 420. Depending on the position and orientation of the holographic combiner, any two or all three of the resulting instances of the image may overlap, or not, in a variety of different ways on the holographic combiner. In some implementations, the area of the holographic combiner where all three images completely overlap may be advantageously used, during operation, as a primary field of view.

Optical splitter 400 represents an example of a configuration of an optical splitter that may be used in conjunction with an accordingly adapted SLP operational mode in order to expand the eyebox of a retinal scanning display system by exit pupil replication.

Figure 5:
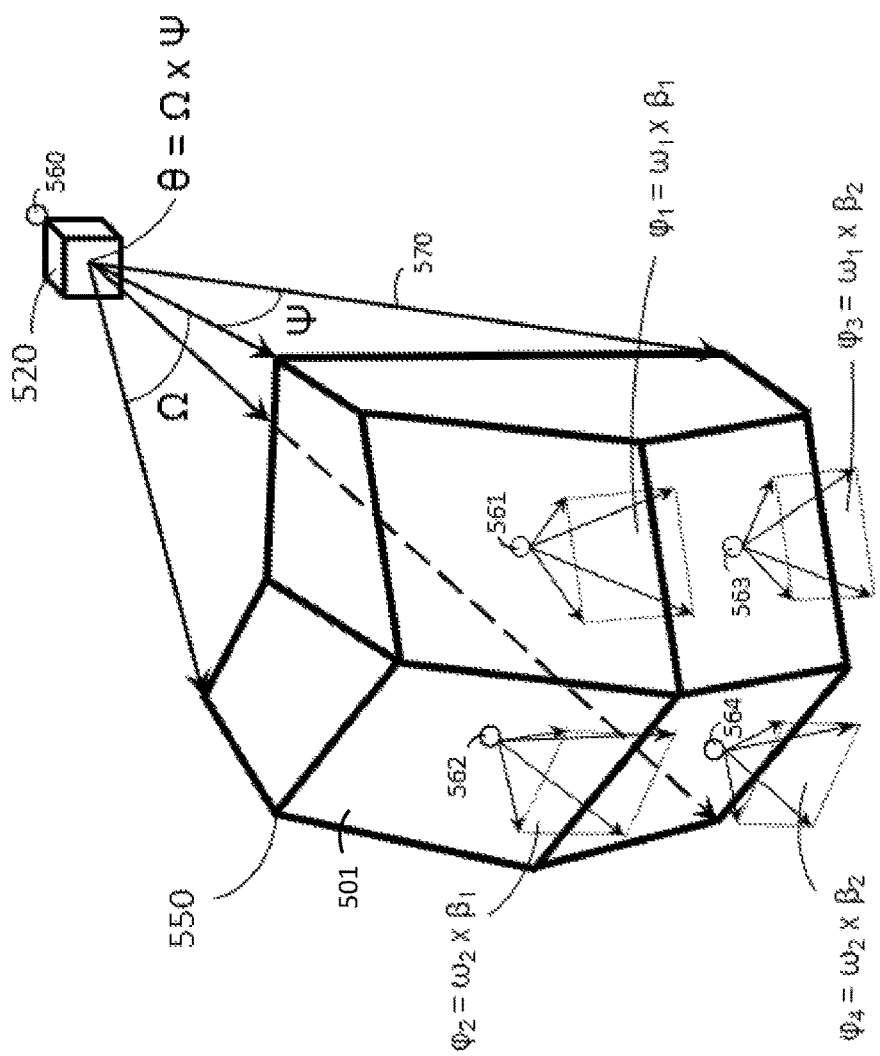
FIG. 5 is an illustrative diagram of an example of an optical splitter for separating the total two-dimensional scan range θ of a scanning laser projector into four two-dimensional sub-ranges $\varphi_1$, $\varphi_2$, $\varphi_3$, and $\varphi_4$ in accordance with the present systems, devices, and methods.

FIG. 5 is an illustrative diagram of an example of an optical splitter 550 for separating the total two-dimensional scan range $\theta$ of a SLP 520 into four two-dimensional sub-ranges $\varphi_1$, $\varphi_2$, $\varphi_3$, and $\varphi_4$ in accordance with the present systems, devices, and methods. Optical splitter 550 is a faceted, prismatic optical device or structure (similar to optical splitter 250 from FIGS. 2A, 2B, 2C, 2D, and 2E) with various surfaces arranged to reflect, refract, diffract, and/or generally influence the optical path of light signals 570 generated by SLP 520 and incident thereon or therein. Optical splitter 550 is a single, solid optical structure formed out of a conventional optic material such as a plastic, glass, or fluorite, though in alternative implementations optical splitter 550 may comprise a contiguous or otherwise mated combination of separate optical structures. Various facets 501 (collectively, only one called out to reduce clutter) of optical splitter 550 are arranged to define distinct input regions (corresponding to specific sub-ranges $\varphi_i$ of the total scan range $\theta$ of SLP 520 and with specific ranges of points of incidence on optical splitter 550) and/or output regions (each respectively corresponding to all optical paths that trace back to a respective one of N=4 virtual positions 561, 562, 563, and 564 for SLP 520). In order to align with and deliberately redirect light signals 570 from SLP 520, the various facets 501 of optical splitter 550 are arranged at different angles relative to the input and output optical paths of light signals 570 and relative to any or all of the length, width, and/or depth of optical splitter 550. Generally, optical splitter 550 is a faceted optical structure with at least N=4 facets 501. At least one respective facet 501 corresponds to each respective one of the N=4 spatially-separated virtual positions 561, 562, 563, and 564 for SLP 520.

FIG. 5 shows that the total two-dimensional scan range $\theta$ of SLP 520 comprises a total scan range $\Omega$ in a first (e.g., horizontal) dimension and a total scan range $\psi$ in a second (e.g., vertical) dimension, with $\theta = \Omega \times \psi$. SLP 520 is located at real position 560. For a sweep of the total two-dimensional scan range $\theta$ of SLP 520, optical splitter 550 (e.g., various external and our internal surfaces and/or facets 501 thereof) receives light signals 570 from SLP 520 at real position 560, splits light signals 570 into four two-dimensional sub-ranges $\varphi_1$, $\varphi_2$, $\varphi_3$, and $\varphi_4$, and redirects light signals 570 so that each two-dimensional sub-range $\varphi_1$, $\varphi_2$, $\varphi_3$, and $\varphi_4$ appears to effectively originate from a respective spatially-separated virtual position 561, 562, 563, and 564 for SLP 520. Virtual positions 561, 562, 563, and 564 are spatially-separated over at least two spatial dimensions (e.g., over two or three spatial dimensions). The particular two-dimensional sub-range $\varphi_i$ into which optical splitter 550 splits any given light signal 570 depends on (e.g., is determined by) the particular point of incidence of that light signal at or on optical splitter 550. Thus, for a sweep of the total two-dimensional scan range $\theta$ of SLP 520, optical splitter 550 redirects first sub-range $\varphi_1$ of light signals 570 that are incident therein or thereon over a first range of points of incidence (e.g., over a first facet 501 of optical splitter 550 that aligns with the first range of points of incidence) to effectively originate from first virtual position 561, optical splitter 550 redirects second sub-range $\varphi_2$ of light signals 570 that are incident therein or thereon over a second range of points of incidence (e.g., over a second facet 501 of optical splitter 550 that aligns with the second range of points of incidence) to effectively originate from second virtual position 562, optical splitter 550 redirects third sub-range $\varphi_3$ of light signals 570 that are incident therein or thereon over a third range of points of incidence (e.g., over a third facet 501 of optical splitter 550 that aligns with the third range of points of incidence) to effectively originate from third virtual position 563, and optical splitter 550 redirects fourth sub-range $\varphi_4$ of light signals 570 that are incident therein or thereon over a fourth range of points of incidence (e.g., over a fourth facet 501 of optical splitter 550 that aligns with the fourth range of points of incidence) to effectively originate from fourth virtual position 564. The respective first, second, third, and fourth facets 501 described above may be located at or on an input surface (i.e., at or on the receiving side) of optical splitter 550, or in an internal volume of optical splitter 550, or at or on an output surface (i.e., at or on the redirecting side) of optical splitter 550. In some implementations, the respective first, second, third, and fourth facets 501 described above may be located at or on an input surface (i.e., at or on the receiving side) of optical splitter or within an internal volume of optical splitter and each of the first, second, third, and fourth facets 501 described may have a corresponding paired facet (e.g., a fifth facet, a sixth facet, a seventh facet, and an eighth facet) located at or on the output surface (i.e., at or on the redirecting side) of optical splitter 550.

Because the total two-dimensional scan range $\theta$ of SLP 520 comprises a total scan range $\Omega$ in a first (e.g., horizontal) dimension and a total scan range $\psi$ in a second (e.g., vertical) dimension, each respective two-dimensional sub-range $\varphi_1$, $\varphi_2$, $\varphi_3$, and $\varphi_4$ comprises a respective combination of a sub-range $\omega_i$ in the first dimension and a sub-range $\beta_i$ in the second dimension. Specifically, first two-dimensional sub-range $\varphi_1$ comprises a first sub-range $\omega_1$ in the first dimension and a first sub-range $\beta_1$ in the second dimension such that $\varphi_1 = \omega_1 \times \beta_1$, second two-dimensional sub-range $\varphi_2$ comprises a second sub-range $\omega_2$ in the first dimension and the first sub-range $\beta_1$ in the second dimension such that $\varphi_2 = \omega_2 \times \beta_1$, third two-dimensional sub-range $\varphi_3$ comprises the first sub-range $\omega_1$ in the first dimension and a second sub-range $\beta_2$ in the second dimension such that $\varphi_3 = \omega_1 \times \beta_2$, and fourth two-dimensional sub-range $\varphi_4$ comprises the second sub-range $\omega_2$ in the first dimension and the second sub-range $\beta_2$ in the second dimension such that $\varphi_4 = \omega_2 \times \beta_2$. For a rectangular or grid-like arrangement of sub-ranges $\varphi_i$, when the total two-dimensional scan range $\theta$ of SLP 520 comprises a total scan range $\Omega$ in a first dimension and a total scan range $\psi$ in a second dimension with $\theta = \Omega \times \psi$, the number of two-dimensional sub-ranges $\varphi_i$ may be equal to at least the number of sub-ranges $\omega_i$ in the first dimension multiplied by the number of sub-ranges $\beta_i$ in the second dimension. However, in other implementations a non-rectangular arrangement of sub-ranges $\varphi_i$, such as a triangular, circular, polygonal, or amorphous arrangement of sub-ranges $\varphi_i$, may be employed.

In addition to various WHUD systems and devices that provide eyebox expansion by exit pupil replication (e.g., exit pupil repetition), the various embodiments described herein also include methods of expanding the eyebox of a WHUD by exit pupil replication.

Figure 6:
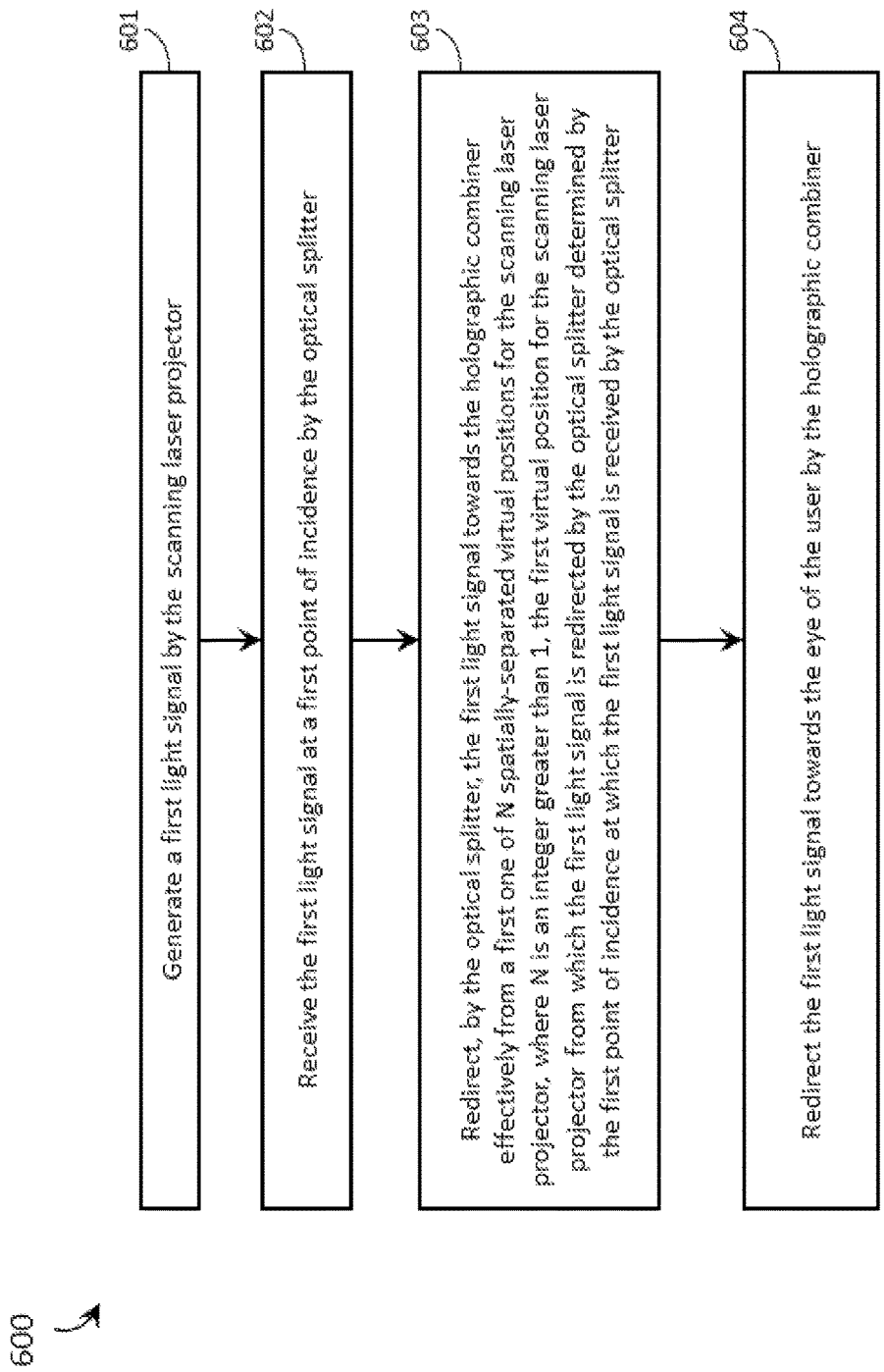
FIG. 6 is a flow-diagram showing a method of operating a wearable heads-up display in accordance with the present systems, devices, and methods.

FIG. 6 is a flow-diagram showing a method 600 of operating a WHUD in accordance with the present systems, devices, and methods. The WHUD may be substantially similar to WHUD 100 or WHUD 200 and generally includes a SLP, an optical splitter, and a holographic combiner. Method 600 includes four acts 601, 602, 603, and 604, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. For the purpose of method 600, the term "user" refers to a person that is wearing the WHUD.

At 601, an SLP of the WHUD generates a first light signal. The first light signal may represent a first instance of an image or a first instance of a portion of an image. For example, the first light signal may represent a first instance of one or more pixel(s) of an image.

At 602, the optical splitter receives the first light signal at a first point of incidence thereon or therein (e.g., at or on an outer surface of the optical splitter or within an inner volume of the optical splitter). Depending on the specific design of the optical splitter in the specific implementation of method 600, the first point of incidence may or may not correspond to a first one of multiple available optical elements (or a first facet of multiple available facets) that make up the optical splitter.

At 603, the optical splitter redirects the first light signal towards the holographic combiner effectively from a first one of N spatially-separated virtual positions for the SLP, where N is an integer greater than 1. The first virtual position for the SLP from which the optical splitter redirects the first light signal may depend on (e.g., may be determined by or in part by) the first point of incidence at which the optical splitter receives the first light signal at 602.

At 604, the holographic combiner redirects the first light signal towards the eye of the user. In particular, the holographic combiner may converge the first light signal to a first one of N exit pupils at or proximate the eye of the user. The first exit pupil to which the holographic combiner converges the first light signal may depend on (e.g., may be determined by) the first virtual position for the SLP from which the optical splitter redirects the first light signal at 603.

In some implementations, the holographic combiner may include a single hologram that converges the first light signal to a first one of N exit pupils at the eye of the user based on the angle of incidence of the first light signal at the particular point or region of the holographic combiner at which the first light signal is received (as determined by, e.g., the first virtual position for the SLP from which the optical splitter redirects the first light signal at 603). Even in such implementations, the holographic combiner may comprise at least two wavelength multiplexed holograms to respectively playback for (e.g., perform the redirecting and/or converging of act 604) at least two components of the first light signal having different wavelengths, such as at least two color components of the first light signal. For example, the SLP may comprise a red laser diode, a green laser diode, and a blue laser diode and the first light signal may comprise a red component, a green component, and a blue component. In this case, the holographic combiner may comprise a red hologram, a green hologram, and a blue hologram and: the red hologram may converge a red component of the first light signal to the first exit pupil at or proximate the eye of the user, the green hologram may converge a green component of the first light signal to the first exit pupil at or proximate the eye of the user, and the blue hologram may converge a blue component of the first light signal to the first exit pupil at or proximate the eye of the user.

In some implementations, the holographic combiner may include N angle-multiplexed red holograms, N angle-multiplexed green holograms, and N angle-multiplexed blue holograms. In this case, a first one of the N angle-multiplexed red holograms may converge the red component of the first light signal to the first exit pupil, a first one of the N angle-multiplexed green holograms may converge the green component of the first light signal to the first exit pupil, and a first one of the N angle-multiplexed blue holograms may converge the blue component of the first light signal to the first exit pupil. The particular ones of the N angle-multiplexed red holograms, the N angle-multiplexed green holograms, and the N angle-multiplexed blue holograms may depend on (e.g., may be determined by) the first virtual position for the SLP from which the optical splitter redirects the first light signal at 603.

Method 600 may be extended in various ways. For example, the SLP may generate at least a second light signal, the optical splitter may receive the second light signal at a second point of incidence and redirect the second light signal towards the holographic combiner effectively from a second one of the N spatially-separated virtual positions for the SLP, and the holographic combiner may converge the second light signal to a second one of the N exit pupils at or proximate the eye of the user. The second virtual position for the SLP from which the optical splitter redirects the second light signal depends on (e.g., may be determined by) the second point of incidence at which the optical splitter receives the second light signal. When the SLP has a total scan range θ, the optical splitter may receive the first light signal (at 602) at a first point of incidence that is included in a first one $\varphi_1$ of N sub-ranges $\varphi_i$ of the total scan range θ for the SLP, where $$\sum_{i=1}^{N} \varphi_i = \theta.$$

In this case, the first one of N spatially-separated virtual positions for the SLP from which the optical splitter redirects the first light signal at 603 may depend on (e.g., may be determined by) the first sub-range $\varphi_1$ of the total scan range θ for the SLP. Similarly, the optical splitter may receive the second light signal at a second point of incidence that is included in a second one $\varphi_2$ of the N sub-ranges $\varphi_i$ of the total scan range θ for the SLP and the second one of N spatially-separated virtual positions for the SLP from which the optical splitter redirects the second light signal may depend on (e.g., may be determined by) the second sub-range $\varphi_2$ of the total scan range θ for the SLP.

Figure 7:
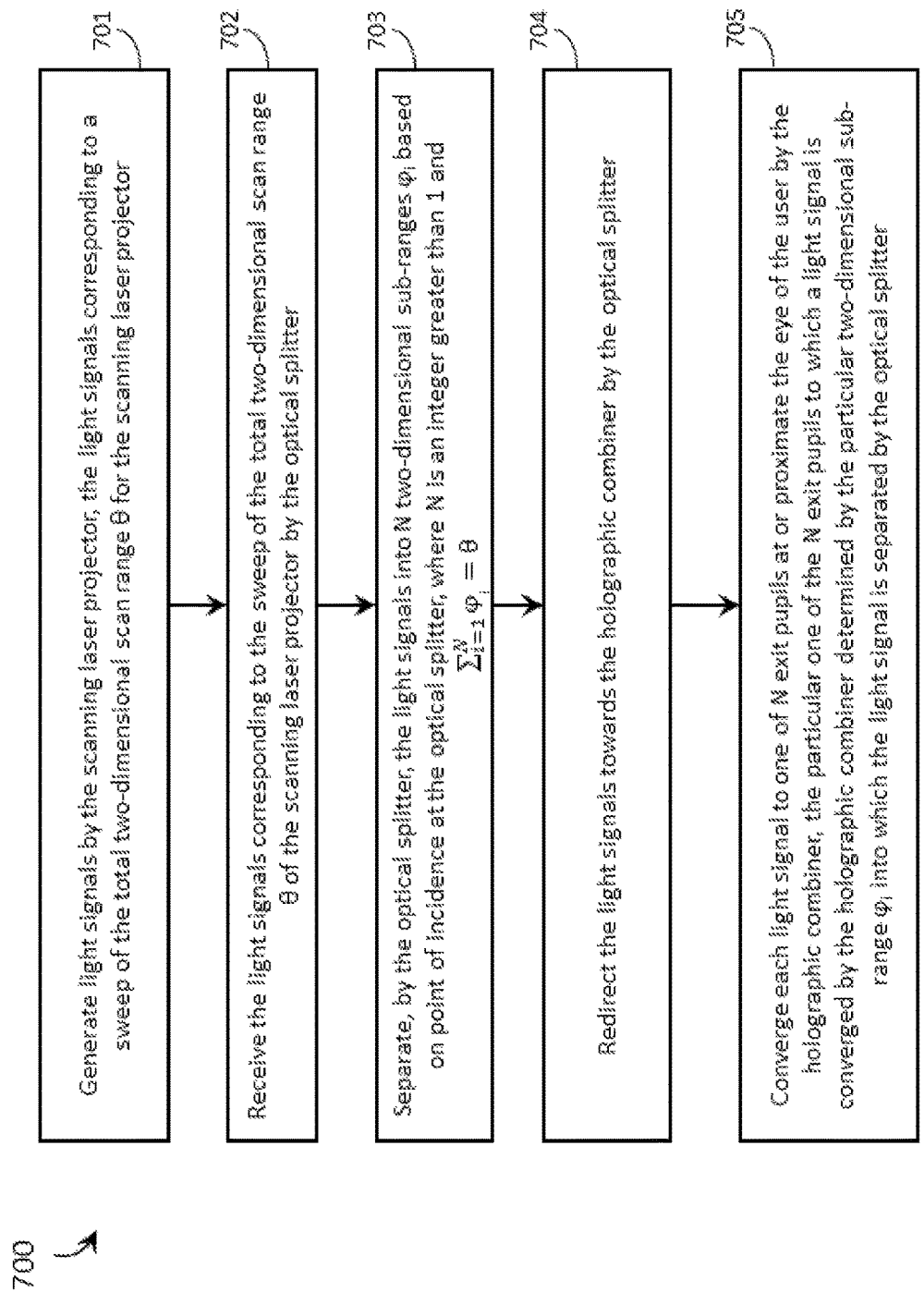
FIG. 7 is a flow-diagram showing a method of operating a wearable heads-up display in accordance with the present systems, devices, and methods.

FIG. 7 is a flow-diagram showing a method 700 of operating a WHUD in accordance with the present systems, devices, and methods. The WHUD may be substantially similar to WHUD 100 or WHUD 200 and generally includes a SLP, an optical splitter, and a holographic combiner. Method 700 includes five acts 701, 702, 703, 704, and 705, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. For the purpose of method 700, the term "user" refers to a person that is wearing the WHUD.

At 701, the SLP generates light signals corresponding to a sweep of the total two-dimensional scan range θ for the SLP. Depending on the specific implementation, the SLP may sweep a total scan range Ω in a first dimension at each discrete step along a sweep of a total scan range ψ in a second dimension in order to sweep the total two-dimensional scan range θ.

At 702, the optical splitter receives the light signals corresponding to the sweep of the total two-dimensional scan range θ by the SLP at 701. The total two-dimensional scan range θ of the SLP may comprise N two-dimensional sub-ranges $\varphi_i$ where N is an integer greater than 1 and $$\sum_{i=1}^{N} \varphi_i = \theta.$$

Each two-dimensional sub-range $\varphi_i$ may comprise a respective combination of a sub-range $\omega_i$ in the first dimension and a sub-range $\beta_i$ in the second dimension. The optical splitter may be positioned, oriented, and/or generally arranged so that each two-dimensional sub-range $\varphi_i$ corresponds to light signals having a respective range of points of incidence at or on the optical splitter.

At 703, the optical splitter splits, divides, furcates, branches, or generally "separates" the light signals into the N two-dimensional sub-ranges $\varphi_i$ based on the point of incidence at which each light signal is received by the optical splitter at 702.

At 704, the optical splitter redirects the light signals towards the holographic combiner. The optical splitter may redirect each light signal effectively from a particular one of N spatially-separated virtual positions for the SLP, with the particular virtual position for any given light signal dependent on (e.g., determined by) the particular two-dimensional sub-range $\varphi_i$ to which the light signal corresponds.

At 705, the holographic combiner converges each light signal to one of N exit pupils at or proximate the eye of the user. The particular one of the N exit pupils to which the holographic combiner converges a light signal may depend on (e.g., may be determined by) the particular two-dimensional sub-range $\varphi_i$ into which the optical splitter separates the light signal at 703. As previously described, the holographic combiner may comprise any number of holograms including, in some implementations, at least N multiplexed holograms. When the holographic combiner includes at least N multiplexed holograms, each one of the at least N multiplexed holograms may converge light signals to one of the N exit pupils.

In accordance with the present systems, devices, and methods, the eyebox of a retina-scanning projector may be expanded by replication of one or more exit pupils. In this approach, a given exit pupil may have a defined size that is about equal to or smaller than the diameter of the eye's pupil, such as about 4 mm or less (e.g., about 2 mm), so that all light from an image enters the eye when the exit pupil impinges on (e.g., aligns with or overlies) the user's (physical) pupil. However, when the user moves their eye, alignment between the exit pupil and the user's pupil may be lost and the projected image may disappear from the user's field of view. Thus, in the "eyebox expansion through exit pupil replication" approaches described herein, multiple exit pupils may be projected and tiled over the user's eye so that at least one exit pupil aligns with the user's eye for multiple, many, most, or all eye positions.

Throughout this specification and the appended claims, the term "about" is sometimes used in relation to specific values or quantities. For example, fast-convergence within "about 2 cm." Unless the specific context requires otherwise, the term about generally means±15%.

The "optical splitter" described herein is an optical device. A first non-limiting example of an optical splitter comprising an arrangement of reflectors is illustrated in (and described with reference to) FIG. 4 and a second non-limiting example of an optical comprising a faceted, prismatic optical device is illustrated (and described with reference to) FIG. 5; however, the present systems, devices, and methods are not intended to be limited to the exemplary implementations of optical splitters from FIGS. 4 and 5. An optical splitter as described herein may comprise any number and/or arrangement of optical elements and/or optical devices (including passive or static elements and active or dynamic (e.g., actuatable) elements), such as mirrors, lenses, diffraction gratings, beam-splitters, prisms, half-silvered surfaces, dichroics, dielectric coatings, and/or any other optical device(s) that a person of skill in the art would employ to split the light signal or image as described herein. A person of skill in the art will appreciate that the optical splitter described herein may employ any one or more of a wide range of different optical device(s), individually or in combination, depending on the requirements of the specific implementation. Accordingly, the present systems, devices, and methods are representative implementations in which an optical device or arrangement of optical devices optically splits the light signal or image described herein.

A person of skill in the art will appreciate that the present systems, devices, and methods may be applied or otherwise incorporated into WHUD architectures that employ one or more light source(s) other than a SLP. For example, in some implementations the SLP described herein may be replaced by another light source, such as a light source comprising one or more light-emitting diodes ("LEDs"), one or more organic LEDs ("OLEDs"), one or more digital light processors ("DLPs"). Such non-laser implementations may advantageously employ additional optics to collimate, focus, and/or otherwise direct projected light signals. Unless the specific context requires otherwise, a person of skill in the art will appreciate that references to a "SLP" throughout the present systems, devices, and methods are representative and that other light sources (combined with other optics, as necessary) may be applied or adapted to serve the same general purpose as the SLPs described herein.

A person of skill in the art will appreciate that the present systems, devices, and methods may be applied or otherwise incorporated into WHUD architectures that employ one or more transparent combiner(s) other than a holographic combiner. For example, in some implementations the holographic combiner described herein may be replaced by a non-holographic device that serves substantially the same general purpose, such as prismatic film, a film that carries a microlens array, and/or a waveguide structure. Such non-holographic implementations may or may not employ additional optics. Unless the specific context requires otherwise, a person of skill in the art will appreciate that references to a "holographic combiner" throughout the present systems, devices, and methods are representative and that other transparent combiners (combined with other optics, as necessary) may be applied or adapted for application to serve the same general purpose as the holographic combiners described herein.

A person of skill in the art will appreciate that the various embodiments for eyebox expansion by exit pupil replication described herein may be applied in non-WHUD applications. For example, the present systems, devices, and methods may be applied in non-wearable heads-up displays and/or in other projection displays, including virtual reality displays, in which the holographic combiner need not necessarily be transparent.

In binocular implementations (i.e., implementations in which display content is projected into both eyes of the user), the total field of view may be increased by deliberately projecting a different field of view to each eye of the user. The two fields of view may overlap, so that both eyes see content at the center of the field of view while the left eye sees more content at the left of the field of view and the right eye sees more content at the right of the field of view.

In some implementations that employ multiple exit pupils, all exit pupils may optionally be active at all times (allowing for temporal separation). Alternatively, implementations that also employ eye-tracking, may activate only the exit pupil that corresponds to where the user is looking (based on eye-tracking) while one or more exit pupil(s) that is/are outside of the user's field of view may be deactivated.

In some implementations, the scan range of the projector can be actively changed to increase resolution in the direction the eye is looking or in the occupied exit pupil. Such is an example of heterogeneous image resolution as described in U.S. Provisional Patent Application Ser. No. 62/134,347.

Eyebox expansion may advantageously enable a user to see displayed content while gazing in a wide range of directions. Furthermore, eyebox expansion may also enable a wider variety of users having a wider range of eye arrangements to adequately see displayed content via a given WHUD. Anatomical details such as interpupillary distance, eye shape, relative eye positions, and so on can all vary from user to user. The various eyebox expansion methods described herein may be used to render a WHUD more robust over (and therefore more usable by) a wide variety of users having anatomical differences. In order to even further accommodate physical variations from user to user, the various WHUDs described herein may include one or more mechanical structure(s) that enable the user to controllably adjust the physical position and/or alignment of one or more exit pupil(s) relative to their own eye(s). Such mechanical structures may include one or more hinge(s), dial(s), flexure(s), tongue and groove or other slidably-coupled components, and the like. For example, at least one of the SLP and/or the optical splitter may be physically movable and/or rotatable on the support structure and the user may physically move and/or rotate the SLP and/or the optical splitter to change a position of at least one of the N exit pupils relative to the eye. Alternatively, the approaches taught herein may advantageously avoid the need for inclusion of such additional mechanical structures, allowing a smaller package and less weight than might otherwise be obtainable.

In some implementations, one or more optical fiber(s) may be used to guide light signals along some of the paths illustrated herein.

The various implementations described herein may, optionally, employ the systems, devices, and methods for preventing eyebox degradation described in U.S. Provisional Patent Application Ser. No. 62/288,947.

The WHUDs described herein may include one or more sensor(s) (e.g., microphone, camera, thermometer, compass, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060, all of which are incorporated by reference herein in their entirety.

The various implementations of WHUDs described herein may include any or all of the technologies described in U.S. Provisional Patent Application Ser. No. 62/117,316, U.S. Provisional Patent Application Ser. No. 62/156,736, and/or U.S. Provisional Patent Application Ser. No. 62/242,844.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Provisional Patent Application Ser. No. 62/214,600, U.S. Provisional Patent Application Ser. No. 62/268,892, U.S. Provisional Patent Application Ser. No. 62/167,767, U.S. Provisional Patent Application Ser. No. 62/271,135, U.S. Provisional Patent Application Ser. No. 62/245,792, U.S. Provisional Patent Application Ser. No. 62/281,041, U.S. Provisional Patent Application Ser. No. 62/134,347, U.S. Provisional Patent Application Ser. No. 62/288,947, U.S. Non-Provisional patent application Ser. No. 14/155,087, U.S. Non-Provisional patent application Ser. No. 14/155,107, PCT Patent Application PCT/US2014/057029, U.S. Provisional Patent Application Ser. No. 62/236,060, U.S. Provisional Patent Application Ser. No. 62/117,316, U.S. Provisional Patent Application Ser. No. 62/156,736, and U.S. Provisional Patent Application Ser. No. 62/242,844, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up display comprising:
a support structure that in use is worn on a head of a user;
a scanning laser projector carried by the support structure, wherein the scanning laser projector has a total scan range $\Omega$ in a first dimension, where $0°<\Omega<180°$;
a holographic combiner carried by the support structure, wherein the holographic combiner is positioned within a field of view of an eye of the user when the support structure is worn on the head of the user; and
an optical splitter carried by the support structure and positioned in an optical path between the scanning laser projector and the holographic combiner, the optical splitter comprising at least one optical element arranged to receive light signals generated by the scanning laser projector and redirect each light signal towards the holographic combiner effectively from one of N spatially-separated virtual positions for the scanning laser projector, where N is an integer greater than 1, the particular virtual position for the scanning laser projector from which a light signal is redirected by the optical splitter determined by a point of incidence at which the light signal is received by the optical splitter, wherein at least one optical element of the optical splitter is arranged to separate the total scan range $\Omega$ of the scanning laser projector in the first dimension into X sub-ranges $\omega_i$ in the first dimension, where $1<X\leq N$ and $$\sum_{i=1}^{X} \omega_i = \Omega,$$

and wherein each one of the X sub-ranges $\omega_i$ corresponds to a different one of the N spatially-separated virtual positions for the scanning laser projector, and wherein the holographic combiner comprises at least one hologram positioned and oriented to redirect the light signals towards the eye of the user.

2. The wearable heads-up display of claim 1 wherein the scanning laser projector has a total two-dimensional scan range $\theta$ and at least one optical element of the optical splitter is arranged to separate the total two-dimensional scan range $\theta$ of the scanning laser projector into N two-dimensional sub-ranges $\varphi_i$, where $$\sum_{i=1}^{N} \varphi_i = \theta,$$

and wherein each one of the N sub-ranges $\varphi_i$ corresponds to a respective one of the N spatially-separated virtual positions for the scanning laser projector.

3. The wearable heads-up display of claim 2 wherein at least one optical element of the optical splitter is arranged to:
receive light signals corresponding to a sweep of the total two-dimensional scan range θ by the scanning laser projector;
separate the light signals corresponding to the sweep of the total two-dimensional scan range θ into the N two-dimensional sub-ranges (p, based on point of incidence at the optical splitter; and
redirect the light signals corresponding to the sweep of the total two-dimensional scan range θ towards the holographic combiner effectively from each of the N spatially-separated virtual positions for the scanning laser projector, the particular virtual position for the scanning laser projector from which each light signal in the sweep of the total two-dimensional scan range θ is redirected by the optical splitter determined by the particular two-dimensional sub-range $\varphi_i$ to which the light signal corresponds.

4. The wearable heads-up display of claim 1 wherein at least one optical element of the optical splitter is arranged to:
receive light signals corresponding to a sweep of the total scan range Ω in the first dimension by the scanning laser projector;
separate the light signals corresponding to the sweep of the total scan range Ω in the first dimension into the X sub-ranges coin the first dimension based on point of incidence at the optical splitter; and
redirect the light signals corresponding to the sweep of the total scan range Ω in the first dimension towards the holographic combiner effectively from at least X of the N spatially-separated virtual positions for the scanning laser projector, the particular virtual position for the scanning laser projector from which each light signal in the sweep of the total scan range Ω in the first dimension is redirected by the optical splitter determined by the particular sub-range $\omega_i$ in the first dimension to which the light signal corresponds.

5. The wearable heads-up display of claim 1 wherein the scanning laser projector has a total scan range ψ in a second dimension, where 0°<ψ<180°, and at least one optical element of the optical splitter is arranged to separate the total scan range ψ of the scanning laser projector in the second dimension into Y sub-ranges $\beta_i$ in the second dimension, where 1<Y≤N and $$\sum_{i=1}^{Y} \beta_i = \Psi,$$

and wherein each one of the Y sub-ranges $\beta_i$ corresponds to a different one of the N spatially-separated virtual positions for the scanning laser projector.

6. The wearable heads-up display of claim 5 wherein at least one optical element of the optical splitter is arranged to:
receive light signals corresponding to a sweep of the total scan range ψ in the second dimension by the scanning laser projector;
separate the light signals corresponding to the sweep of the total scan range ψ in the second dimension into the Y sub-ranges $\beta_i$ in the second dimension based on point of incidence at the optical splitter; and
redirect the light signals corresponding to the sweep of the total scan range ψ in the second dimension towards the holographic combiner effectively from at least Y of the N spatially-separated virtual positions for the scanning laser projector, the particular virtual position for the scanning laser projector from which a light signal in the sweep of the total scan range ψ in the second dimension is redirected by the optical splitter determined by the particular sub-range $\beta_i$ in the second dimension to which the light signal corresponds.

7. The wearable heads-up display of claim 1 wherein the support structure has a general shape and appearance of an eyeglasses frame.

8. The wearable heads-up display of claim 7, further comprising a prescription eyeglass lens, wherein the holographic combiner is carried by the prescription eyeglass lens.

9. The wearable heads-up display of claim 1 wherein the at least one hologram of the holographic combiner converges light signals to respective ones of N exit pupils at or proximate the eye of the user, the particular exit pupil determined by the particular virtual position for the scanning laser projector from which a light signal is redirected by the optical splitter.

10. The wearable heads-up display of claim 9 wherein the holographic combiner includes at least N multiplexed holograms, and wherein each one of the at least N multiplexed holograms converges light signals corresponding to a respective one of the N spatially-separated virtual positions for the scanning laser projector to a respective one of the N exit pupils at or proximate the eye of the user.

11. The wearable heads-up display of claim 9 wherein:
the scanning laser projector includes a red laser diode, a green laser diode, and a blue laser diode; and
the holographic combiner includes a wavelength-multiplexed holographic combiner that includes at least one red hologram, at least one green hologram, and at least one blue hologram, and wherein for a light signal redirected from a particular one of the N spatially-separated virtual positions for the scanning laser projector by the optical splitter, the at least one red hologram converges a red component of the light signal to a particular one of the N exit pupils at or proximate the eye of the user, the at least one green hologram converges a green component of the light signal to the particular one of the N exit pupils at or proximate the eye of the user, and the at least one blue hologram converges a blue component of the light signal to the particular one of the N exit pupils at or proximate the eye of the user.

12. The wearable heads-up display of claim 11 wherein the holographic combiner includes a wavelength-multiplexed and angle-multiplexed holographic combiner that includes at least N angle-multiplexed red holograms, at least N angle-multiplexed green holograms, and at least N angle-multiplexed blue holograms, and wherein each one of the at least N angle-multiplexed red holograms converges red components of light signals redirected from a respective one of the N spatially-separated virtual positions for the scanning laser projector by the optical splitter to a respective one of the N exit pupils at or proximate the eye of the user, each one of the at least N angle-multiplexed green holograms converges green components of light signals redirected from a respective one of the N spatially-separated virtual positions for the scanning laser projector by the optical splitter to a respective one of the N exit pupils at or proximate the eye of the user, and each one of the at least N angle-multiplexed blue holograms converges blue components of light signals redirected from a respective one of the N spatially-separated virtual positions for the scanning laser projector by the optical splitter to a respective one of the N exit pupils at or proximate the eye of the user.

13. The wearable heads-up display of claim 9 wherein at least one of the scanning laser projector and/or the optical splitter is physically movable and/or rotatable on the support structure, and wherein physical movement and/or rotation of the scanning laser projector and/or optical splitter changes a position of at least one of the N exit pupils relative to the eye of the user.

14. The wearable heads-up display of claim 1 wherein the light signal includes an image comprising at least two pixels.

15. The wearable heads-up display of claim 1 wherein at least one optical element of the optical splitter is arranged to receive N light signals generated by the scanning laser projector and redirect the N light signals towards the holographic combiner effectively from respective ones of the N spatially-separated virtual positions for the scanning laser projector, the particular virtual position for the scanning laser projector from which each one of the N light signals is redirected by the optical splitter determined by a respective point of incidence at which each light signal is received by the optical splitter, and wherein the holographic combiner comprises at least one hologram positioned and oriented to converge each one of the N light signals to a respective exit pupil at or proximate the eye of the user.

16. The wearable heads-up display of claim 15 wherein the N light signals include N different instances of a same image.

17. The wearable heads-up display of claim 15 wherein the N light signals include N different instances of a same pixel of an image.

18. The wearable heads-up display of claim 1 wherein the optical splitter comprises a faceted optical structure with at least N facets, and wherein at least one respective facet corresponds to each respective one of the N spatially-separated virtual positions for the scanning laser projector.

19. A wearable heads-up display comprising:
   a support structure that in use is worn on a head of a user;
   a scanning laser projector carried by the support structure and having a total two-dimensional scan range $\theta$ including a total scan range $\Omega$ in a first dimension, where $0° < \Omega < 180°$;
   a holographic combiner carried by the support structure, wherein the holographic combiner is positioned within a field of view of an eye of the user when the support structure is worn on the head of the user;
   an optical splitter carried by the support structure and positioned in an optical path between the scanning laser projector and the holographic combiner, wherein the optical splitter comprises at least one optical element arranged to:
   receive light signals corresponding to a sweep of the total two-dimensional scan range $\theta$ by the scanning laser projector;
   separate the light signals into N two-dimensional sub-ranges $\varphi_i$ based on point of incidence at the optical splitter, where N is an integer greater than 1 and $$\sum_{i=1}^{N} \varphi_i = \theta;$$

and
   redirect the light signals towards the holographic combiner, and wherein the holographic combiner comprises at least one hologram positioned and oriented to converge light signals to respective ones of N exit pupils at or proximate the eye of the user, the particular exit pupil towards which a light signal is redirected by the holographic combiner determined by the particular two-dimensional sub-range $\varphi_i$ into which the light signal is separated by the optical splitter, and wherein at least one element of the optical splitter is arranged to:
   receive light signals corresponding to at least one sweep of the total scan range $\Omega$ in the first dimension by the scanning laser projector;
   separate the light signals into X sub-ranges $\omega_i$ in the first dimension based on point of incidence at the optical splitter, where $1 < X \leq N$ and $$\sum_{i=1}^{X} \omega_i = \Omega;$$

and
   redirect the light signals towards the holographic combiner, and wherein at least one hologram of the holographic combiner is positioned and oriented to converge the light signals to respective ones of at least X of the N exit pupils at or proximate the eye of the user, the determined by at least the particular sub-range $\omega_i$ in the first dimension into which the light signal is separated by the optical splitter.

20. The wearable heads-up display of claim 19 wherein the total two-dimensional scan range $\theta$ of the scanning laser projector includes a total scan range $\psi$ in a second dimension, where $0° < \psi < 180°$, and wherein at least one optical element of the optical splitter is arranged to:
   receive light signals corresponding to at least one sweep of the total scan range $\psi$ in the second dimension by the scanning laser projector;
   separate the light signals corresponding to the at least one sweep of the total scan range $\psi$ in the second dimension into Y sub-ranges $\beta_i$ in the second dimension based on point of incidence at the optical splitter, where $1 < Y \leq N$ and $$\sum_{i=1}^{Y} \beta_i = \Psi;$$

and
   redirect the light signals corresponding to the at least one sweep of the total scan range $\psi$ in the second dimension towards the holographic combiner, and wherein at least one hologram of the holographic combiner is positioned and oriented to converge the light signals corresponding to the at least one sweep of the total scan range $\psi$ in the second dimension to different ones of the N exit pupils at or proximate the eye of the user, the particular exit pupil towards which a light signal is redirected by the holographic combiner determined by both the particular sub-range $\omega_i$ in the first dimension and the particular sub-range $\beta_i$ in the second dimension into which the light signal is separated by the optical splitter.

21. A method of operating a wearable heads-up display, the wearable heads-up display including:
a scanning laser projector that includes a red laser diode, a green laser diode, and a blue laser diode;
an optical splitter, and
a holographic combiner positioned within a field of view of an eye of a user when the wearable heads-up display is worn on a head of the user, wherein the holographic combiner is a wavelength-multiplexed holographic combiner that includes at least N multiplexed red holograms, at least N multiplexed green holograms, and at least N multiplexed blue holograms, the method comprising:
generating a first light signal by the scanning laser projector, the first light signal including a red component, a green component, and a blue component;
receiving the first light signal at a first point of incidence by the optical splitter;
redirecting, by the optical splitter, the first light signal towards the holographic combiner effectively from a first one of N spatially-separated virtual positions for the scanning laser projector, where N is an integer greater than 1, the first virtual position for the scanning laser projector from which the first light signal is redirected by the optical splitter determined by the first point of incidence at which the first light signal is received by the optical splitter; and
converging the first light signal to a first one of N exit pupils at or proximate the eye of the user by the holographic combiner, wherein converging the first light signal to a first one of N exit pupils at or proximate the eye of the user by the holographic combiner includes:
converging the red component of the first light signal to the first exit pupil by one of the at least N red holograms, the one of the at least N red holograms determined by the first virtual position for the scanning laser projector from which the first light signal is redirected by the optical splitter;
converging the green component of the first light signal to the first exit pupil by one of the at least N green holograms, the one of the at least N green holograms determined by the first virtual position for the scanning laser projector from which the first light signal is redirected by the optical splitter; and
converging the blue component of the first light signal to the first exit pupil by one of the at least N blue holograms, the one of the at least N blue holograms determined by the first virtual position for the scanning laser projector from which the first light signal is redirected by the optical splitter, wherein the first exit pupil to which the first light signal is converged by the holographic combiner is determined by the first virtual position for the scanning laser projector from which the first light signal is redirected by the optical splitter.

22. The method of claim 21 wherein the holographic combiner includes a wavelength-multiplexed and angle-multiplexed holographic combiner that includes at least N angle-multiplexed red holograms, at least N angle-multiplexed green holograms, and at least N angle-multiplexed blue holograms, and wherein:

converging a red component of the first light signal to the first exit pupil by the at least one red hologram includes converging the red component of the first light signal to the first exit pupil by a first one of the N angle-multiplexed red holograms, the first angle-multiplexed red hologram by which the red component of the first light signal is converged determined by the first virtual position for the scanning laser projector from which the first light signal is redirected by the optical splitter;
converging a green component of the first light signal to the first exit pupil by the at least one green hologram includes converging the green component of the first light signal to the first exit pupil by a first one of the N angle-multiplexed green holograms, the first angle-multiplexed green hologram by which the green component of the first light signal is converged determined by the first virtual position for the scanning laser projector from which the first light signal is redirected by the optical splitter; and
converging a blue component of the first light signal to the first exit pupil by the at least one blue hologram includes converging the blue component of the first light signal to the first exit pupil by a first one of the N angle-multiplexed blue holograms, the first angle-multiplexed blue hologram by which the blue component of the first light signal is converged determined by the first virtual position for the scanning laser projector from which the first light signal is redirected by the optical splitter.

23. The method of claim 21, further comprising:
generating a second light signal by the scanning laser projector;
receiving the second light signal at a second point of incidence by the optical splitter;
redirecting, by the optical splitter, the second light signal towards the holographic combiner effectively from a second one of the N spatially-separated virtual positions for the scanning laser projector, the second virtual position for the scanning laser projector from which the second light signal is redirected by the optical splitter determined by the second point of incidence at which the second light signal is received by the optical splitter; and
converging the second light signal to a second one of the N exit pupils at or proximate the eye of the user by the holographic combiner.

24. The method of claim 23 wherein:
the scanning laser projector has a total scan range $\theta$;
receiving the first light signal at a first point of incidence by the optical splitter includes receiving, by the optical splitter, the first light signal at a first point of incidence that is included in a first one $\varphi_1$ of N sub-ranges $\varphi_i$ of the total scan range $\theta$ for the scanning laser projector, where $$\sum_{i=1}^{N} \varphi_i = \theta;$$

redirecting, by the optical splitter, the first light signal towards the holographic combiner effectively from a first one of N spatially-separated virtual positions for the scanning laser projector, the first virtual position for the scanning laser projector from which the first light signal is redirected by the optical splitter determined by the first point of incidence at which the first light signal is received by the optical splitter includes redirecting, by the optical splitter, the first light signal towards the holographic combiner effectively from a first one of N spatially-separated virtual positions for the scanning laser projector, the first virtual position for the scanning laser projector from which the first light signal is redirected by the optical splitter determined by the first sub-range $\varphi_1$ of the total scan range $\theta$ for the scanning laser projector;

receiving the second light signal at a second point of incidence by the optical splitter includes receiving, by the optical splitter, the second light signal at a second point of incidence that is included in a second one $\varphi_2$ of the N sub-ranges $\varphi_i$ of the total scan range $\theta$ for the scanning laser projector; and redirecting, by the optical splitter, the second light signal towards the holographic combiner effectively from a second one of the N spatially-separated virtual positions for the scanning laser projector, the second virtual position for the scanning laser projector from which the second light signal is redirected by the optical splitter determined by the second point of incidence at which the second light signal is received by the optical splitter includes redirecting, by the optical splitter, the second light signal towards the holographic combiner effectively from a second one of the N spatially-separated virtual positions for the scanning laser projector, the second virtual position for the scanning laser projector from which the second light signal is redirected by the optical splitter determined by the second sub-range $\varphi_2$ of the total scan range $\theta$ for the scanning laser projector.

25. The method of claim 21 wherein generating a first light signal by the scanning laser projector includes generating a first instance of an image by the scanning laser projector, the first instance of the image including at least two pixels.

26. The method of claim 21 wherein generating a first light signal by the scanning laser projector includes generating a first instance of a first pixel of an image by the scanning laser projector.

* * * * *